US012596618B1

(12) United States Patent (10) Patent No.: US 12,596,618 B1
Bhattacharyya et al. (45) Date of Patent: Apr. 7, 2026

(54) CORRUPTED BUCKET HANDLING IN A PEER CLUSTER

(71) Applicant: Cisco Technology, Inc., San Jose, CA (US)

(72) Inventors: Sayantan Bhattacharyya, Sydney (AU); Wendi Qiu, Norwest (AU); Christopher Michael Sutton, North Ryde (AU)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/651,689

(22) Filed: Apr. 30, 2024

(51) Int. Cl.
 *G06F 11/14* (2006.01)
 *G06F 11/1446* (2026.01)
 *H04L 67/1074* (2022.01)

(52) U.S. Cl.
 CPC ...... *G06F 11/1464* (2013.01); *G06F 11/1469* (2013.01); *H04L 67/1074* (2013.01)

(58) Field of Classification Search
 CPC ............. G06F 11/1464; G06F 11/1469; H04L 67/1074
 See application file for complete search history.

(56) References Cited

U.S. PATENT DOCUMENTS

| | | | |
|---|---|---|---|
| 7,937,344 | B2 | 5/2011 | Baum et al. |
| 8,112,425 | B2 | 2/2012 | Baum et al. |
| 8,751,529 | B2 | 6/2014 | Zhang et al. |
| 8,788,525 | B2 | 7/2014 | Neels et al. |
| 9,215,240 | B2 | 12/2015 | Merza et al. |
| 9,286,413 | B1 | 3/2016 | Coates et al. |
| 10,127,258 | B2 | 11/2018 | Lamas et al. |
| 12,265,858 | B1 * | 4/2025 | Bhattacharyya ...... G06F 9/5072 |
| 2004/0093555 | A1 * | 5/2004 | Therrien ............. G06F 11/1662 |
| | | | 714/805 |
| 2019/0098106 | A1 | 3/2019 | Mugel et al. |

(Continued)

OTHER PUBLICATIONS

Splunk Enterprise 8.0.0 Overview, available online, retrieved May 20, 2020 from docs.splunk.com, 17 pages.

(Continued)

*Primary Examiner* — Michael Maskulinski
*Assistant Examiner* — Kayo Lisa Rusin
(74) *Attorney, Agent, or Firm* — Shook, Hardy & Bacon L.L.P.

(57) ABSTRACT

A method for recovering corrupted buckets in a peer cluster is presented. A cluster manager sends a request to peer nodes storing bucket copies corresponding to a corrupted bucket to report bucket health metrics of the respective bucket copies. The peer nodes rebuild the respective bucket copies and report updated bucket health metrics corresponding to the respective rebuilt bucket copies to the cluster manager. The cluster manager elects a bucket copy with a highest searchable event count as the canonical bucket copy. The cluster manager sends all peer nodes having bucket copies with searchable event counts less than the searchable event count of the canonical bucket copy an instruction to discard their respective bucket copies. The cluster manager sends the peer node storing the canonical bucket copy an instruction to replicate the canonical bucket copy to the peer nodes with discarded bucket copies.

20 Claims, 12 Drawing Sheets

(56) References Cited

U.S. PATENT DOCUMENTS

2019/0303373 A1\* 10/2019 Patel ...................... G06F 16/27
2021/0279140 A1\* 9/2021 Sarkar ................. H04L 41/0654

OTHER PUBLICATIONS

Splunk Cloud 8.0.2004 User Manual, available online, retrieved May 20, 2020 from docs.splunk.com, 66 pages.
Splunk Quick Reference Guide, updated 2019, available online at https://www.splunk.com/pdfs/solution-guides/splunk-quick-reference-guide.pdf, retrieved May 20, 2020, 6 pages.
Carasso, David, "Exploring Splunk", published by CITO Research, New York, NY, Apr. 2012, 156 pages.
Bitinka, Ledion, et al., "Optimizing Data Analysis with a Semi-structured Time Series Database", self-published, first presented at "Workshop on Managing Systems via Log Analysis and Machine Learning Techniques (SLAML)", Vancouver, British Columbia, Oct. 3, 2010, 9 pages.

\* cited by examiner

400

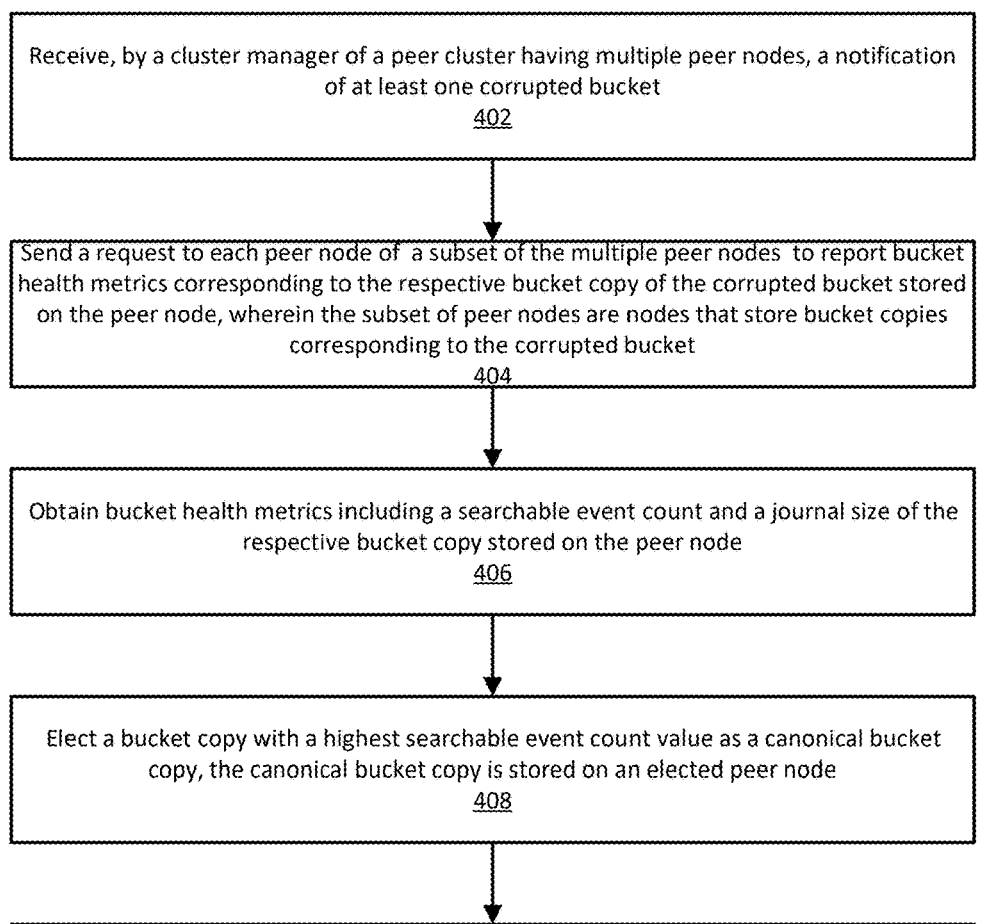

Receive, by a cluster manager of a peer cluster having multiple peer nodes, a notification of at least one corrupted bucket
402

Send a request to each peer node of a subset of the multiple peer nodes to report bucket health metrics corresponding to the respective bucket copy of the corrupted bucket stored on the peer node, wherein the subset of peer nodes are nodes that store bucket copies corresponding to the corrupted bucket
404

Obtain bucket health metrics including a searchable event count and a journal size of the respective bucket copy stored on the peer node
406

Elect a bucket copy with a highest searchable event count value as a canonical bucket copy, the canonical bucket copy is stored on an elected peer node
408

Send a discard command to the peer nodes having bucket copies with searchable event counts less than the searchable event count of the canonical bucket copy to discard their respective bucket copies and send a replicate command to the elected peer node to replicate the canonical bucket copy to the peer nodes of the peer cluster
410

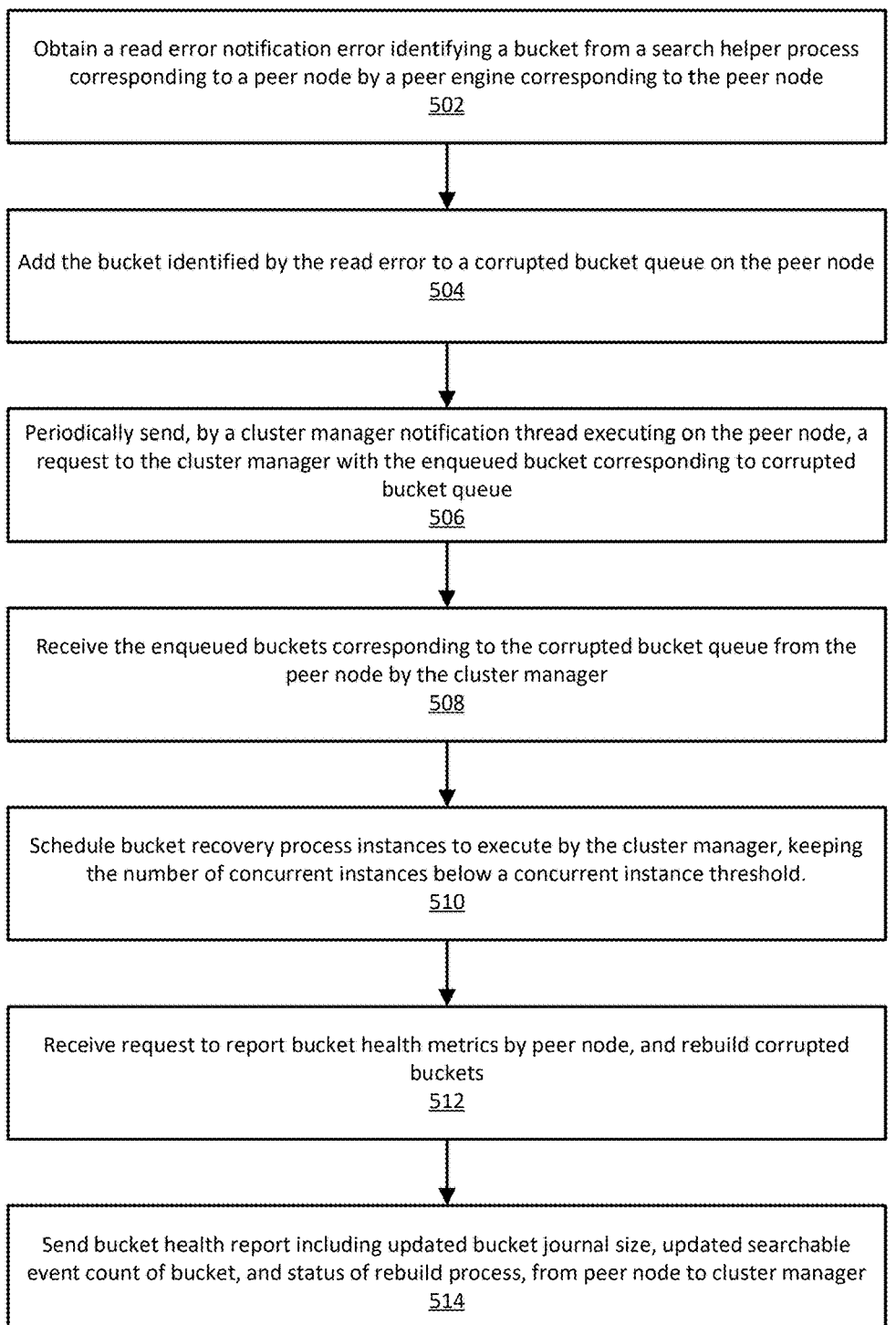

Obtain a read error notification error identifying a bucket from a search helper process corresponding to a peer node by a peer engine corresponding to the peer node
502

Add the bucket identified by the read error to a corrupted bucket queue on the peer node
504

Periodically send, by a cluster manager notification thread executing on the peer node, a request to the cluster manager with the enqueued bucket corresponding to corrupted bucket queue
506

Receive the enqueued buckets corresponding to the corrupted bucket queue from the peer node by the cluster manager
508

Schedule bucket recovery process instances to execute by the cluster manager, keeping the number of concurrent instances below a concurrent instance threshold.
510

Receive request to report bucket health metrics by peer node, and rebuild corrupted buckets
512

Send bucket health report including updated bucket journal size, updated searchable event count of bucket, and status of rebuild process, from peer node to cluster manager
514

FIG. 5

Admin Path To Trigger A Corrupt Bucket Fixup In CM

1000

CORRUPTED BUCKET HANDLING IN A PEER CLUSTER

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Large-scale distributed data intake, storage and indexing systems include thousands of hosts operating collectively to service requests from even larger numbers of remote clients. The systems may be configured in multiple networked clusters of computing systems. A cluster typically has computing systems of similar scale and complementary or similar functionality in operative and communicative mutual connectivity. The computing systems are referred to as peers, or peer nodes. In some cluster configurations, peer nodes maintain replicated data copies to promote high availability and disaster recovery. When data loss occurs, a problem is identifying the correct copy of the data.

BRIEF DESCRIPTION OF THE DRAWINGS

Illustrative examples are described in detail below with reference to the following figures:

FIG. 4 illustrates an example process for bucket recovery in a peer cluster.

FIG. 5 illustrates an example process for rebuilding and replicating a bucket.

DETAILED DESCRIPTION

Figure 1:
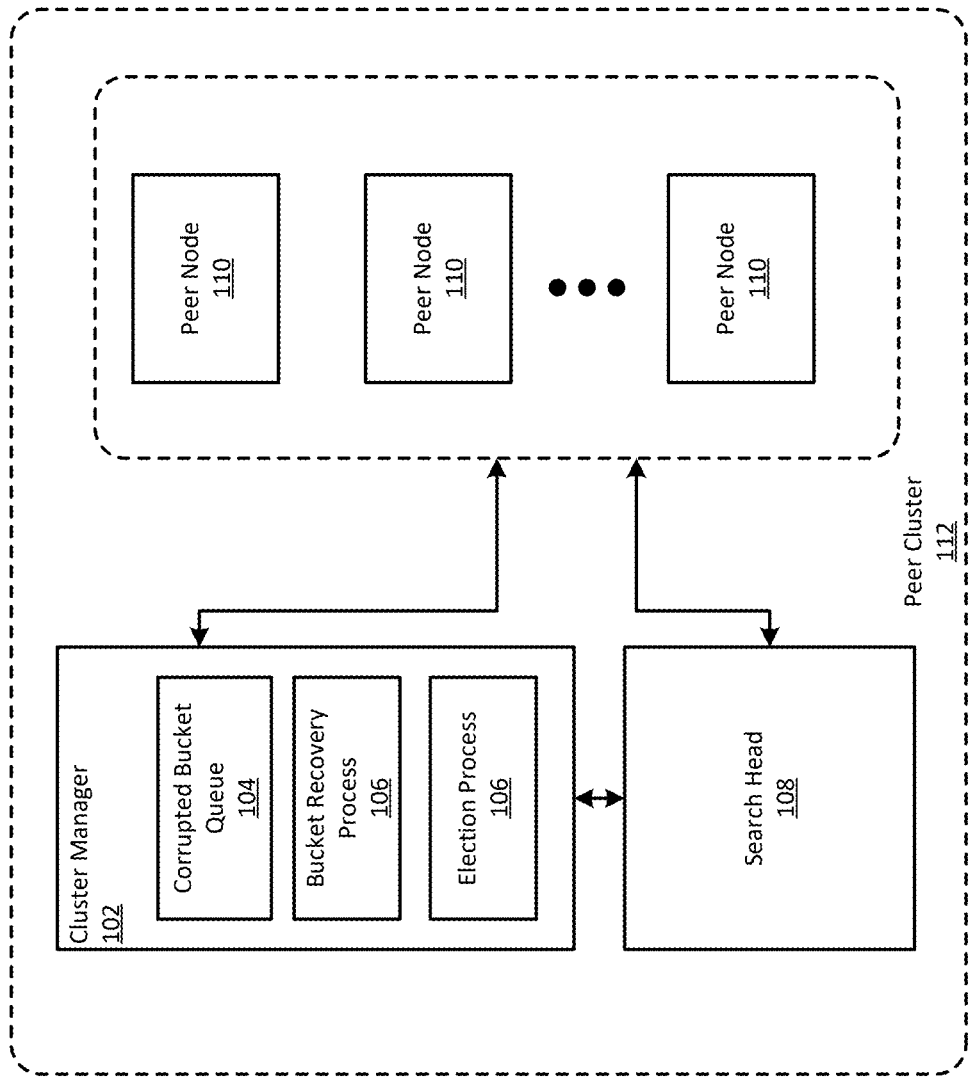
FIG. 1 illustrates an example diagram of a peer cluster.

Peer clusters of large-scale data ingestion, storage and indexing systems replicate copies of data within the cluster. Additionally, individual peer nodes of the peer cluster may also ingest data from different external sources, creating new buckets out of raw data, and replicating the new buckets across the cluster. The buckets may be flat files, or database records, or events, or other data structures for unstructured, or time series data. An event is a discrete portion of machine data that is associated with a timestamp. If there are errors in replication due to network failures or data center outages, individual peer nodes in the peer cluster may have buckets that are not accurately replicated, leading to different content sizes and versions of the bucket between the peer nodes.

In some implementations, a cluster manager operating within the peer cluster may coordinate an election process between the source peer replicating the bucket and the target peer receiving the bucket copy. A vote on a bucket copy entails one or more metrics about the bucket copy, for example, a size metric, or a source preference. For example, if the source peer node is online and communicable with the cluster manager, then the version of the bucket from the source is given a higher vote than the copies of the bucket present in the target peer nodes of the replication operation. If the source peer node is not online or communicable with the cluster manager, then one of the copies of the bucket is elected over the remaining available copies as the valid copy to be replicated across the target peer nodes. To this end, a size metric may be considered (e.g., a maximum size) when voting for a bucket copy, or the most recently successfully accessed copy, and the like.

A challenge in the implementation described herein is the lack of consideration of the possibility that the source, or originating, peer node of the bucket may be compromised in and of itself. More specifically, after an initial replication, a cluster manager may determine that a bucket has different versions across the peer cluster. The determination may be made due to one or more peer nodes including the source peer node of the bucket experiencing a local data corruption event and subsequently registering inconsistent bucket metrics with the cluster manager. If, in this situation, the cluster manager preferentially elects the source peer node version, or elects a version based on a size metric, instructing the target peer nodes to discard their copies of the bucket, then potentially, silent data loss of one or more valid copies of the bucket may occur.

Additionally, when a peer node goes offline and restarts, subsequently attempting to rejoin a peer cluster, then some implementations of the rejoin protocol may deny access to the peer node based on the peer node presenting faulty bucket metrics instead of initiating a recovery process. Failure of the peer cluster to rejoin at full operating capacity may further lead to issues of availability, latency, and scalability.

The present disclosure includes a system that handles corrupted data recovery based on characteristics of the copy of the bucket that reflect the caliber of the copy. In one or more implementations, systems described in the present disclosure extract events from raw data. The events are indexed and stored in collections of directories, referred to as buckets. A bucket includes the events. In some embodiments, the events are stored in buckets as raw data files with corresponding index files. The raw data file includes the event data and the index files include metadata used to search for events in the raw data file. In one or more implementations, the raw data file is known as the journal file. Thus, the journal file may have the set of events that are in the bucket. The journal file may be a compressed file. Buckets are the data structures that are replicated by peer nodes in a peer cluster. Thus, the bucket copies are copies of the bucket. In one or more implementations, systems described in the present disclosure may handle searchable buckets, including index files and raw data files, and non-searchable buckets, including raw data files without the index files. Index files include metadata relating to the events in the raw data file. One aspect of the metadata relates to a searchable event count. In one or more implementations of the systems described in the present disclosure, the searchable event count of a bucket is a measure of the caliber of the bucket. In other words, a bucket copy with a higher searchable event count value is preferable to a bucket copy with a lower searchable event count value.

An additional aspect of the process of handling corrupted bucket recovery is rebuilding the bucket copies. The rebuild process entails the re-creation of an index file of a bucket, corresponding to the journal file. The rebuild process further converts non-searchable buckets including journal files, to searchable buckets including index files and journal files. In one or more implementations, the rebuild process is config- ured with a flag or a parameter to be fault-tolerant to, or ignore, any read errors with an end to obtaining the highest possible searchable event count for the bucket being rebuilt. The resulting index files corresponding to the bucket copies of the corrupted bucket include the most current searchable event count of the bucket copy. The election process, there- fore, obtains the most current searchable event count infor- mation to select the bucket copy for replication. The bucket copy is the copy of the corrupted bucket and refers to the various copies of the bucket detected as having at least one corrupted copy.

FIG. 1 illustrates an example diagram of a peer cluster configuration. As shown in FIG. 1, the system 100 includes a cluster manager 102, a search head 108, and multiple peer nodes 110 mutually communicatively and operatively coupled, collectively forming a peer cluster 112. Each of the peer nodes may be implemented as a computing system, a virtual computing system, or a portion thereof. A peer node may have or be allocated a set of hardware computing resources. The peer nodes are configured to store buckets. A peer node 110 of the peer cluster 112 is configured to replicate the data of the remaining peer nodes of the peer cluster. Thus, the peer cluster 112 keeps multiple copies of the data, and the process of replication is referred to as index replication. In some implementations, the peer nodes 110 of the system 100 are indexers. An indexer is configured to store data in buckets with a corresponding index used to search the buckets stored on the peer node. An indexer may be implemented as the indexing system described in refer- ence to FIG. 9 and FIG. 10.

The peer nodes 110 are configured for automatic failover from one peer node to the next. The number of peer nodes 110 in a peer cluster 112 depends on a replication factor. The replication factor is the number of copies of data that is maintained by the cluster. For example, if the replication factor of a peer cluster 112 is three, then the peer cluster 112 is configured for at least three peer nodes. In the example, the number of peer nodes in a peer cluster corresponds at least to the replication factor and may be greater than the replication factor. The peer nodes 110 receive and index incoming data in buckets and replicate data from other peer nodes in the cluster. A peer node 110 is configured to index incoming data received and simultaneously store copies of buckets from other peer nodes.

In addition to the peer nodes 110, the peer cluster 112 includes the cluster manager 102. A peer cluster 112 may have a single cluster manager. The cluster manager 102 coordinates the replicating activities of the peer nodes 110 and communicates with the search head 108 on the location of data in the buckets. The cluster manager 102 manages the configuration of the peer nodes 110 and orchestrates reme- dial activities if a peer node 110 goes offline. In the system 100, the cluster manager 102 further includes specific data structures and functionality for the recovery of corrupted buckets. The cluster manager 102 includes a corrupted bucket queue 104, storing identifiers of corrupted buckets. In one or more implementations, the cluster manager 102 may receive notifications from one or more of the peer nodes 110 of a corrupted bucket. The cluster manager stores informa- tion corresponding to the corrupted bucket in the corrupted bucket queue 104. For example, the corrupted bucket queue 104 stores identifiers of corrupted buckets.

The cluster manager 102 further includes functionality to asynchronously schedule and trigger a bucket recovery process 106 for the peer nodes 110. The bucket recovery process 106 orchestrates the peer nodes 110 in a bucket recovery operation. The bucket recovery operation includes the cluster manager instantiating one or more bucket recov- ery process instances, triggering the election process, moni- toring the corrupted bucket queues, and performing other operations to cause the peer nodes to discard, or mark as discarded, corrupted bucket copies and replicate, or receive replications of, an elected bucket copy (i.e., the canonical bucket copy). As such, the cluster manager 102 includes the election process 106. The election process 106 is the func- tional component of the cluster manager 102 that includes the election algorithm and configuration parameters to elect a canonical bucket copy according to an election metric. In one implementation, the election metric includes the search- able event count. In one or more implementations, the election process may be selected by a system administrator via a web interface of an administrative application com- municatively coupled to the cluster manager 102. Notably, a bucket recovery operation includes the execution of the bucket recovery process, the election process, and other processes, for example, peer node monitoring during the bucket recovery operation, notifying the administrative application of a failed bucket recovery operation, and the like.

The system 100 may further include a search head 108. The search head 108 is configured to send search requests across the peer nodes 110. In one or more implementations, the search head 108 may receive a read error from a peer node when performing a search. The role of the search head 108 in triggering the identification of a corrupted bucket is described in further detail in reference to FIG. 2. In some implementations, the peer cluster 112 may include multiple search heads 108. In some embodiments, the search head 108 may be implemented as described in reference to FIG. 8 and FIG. 10.

Figure 2:
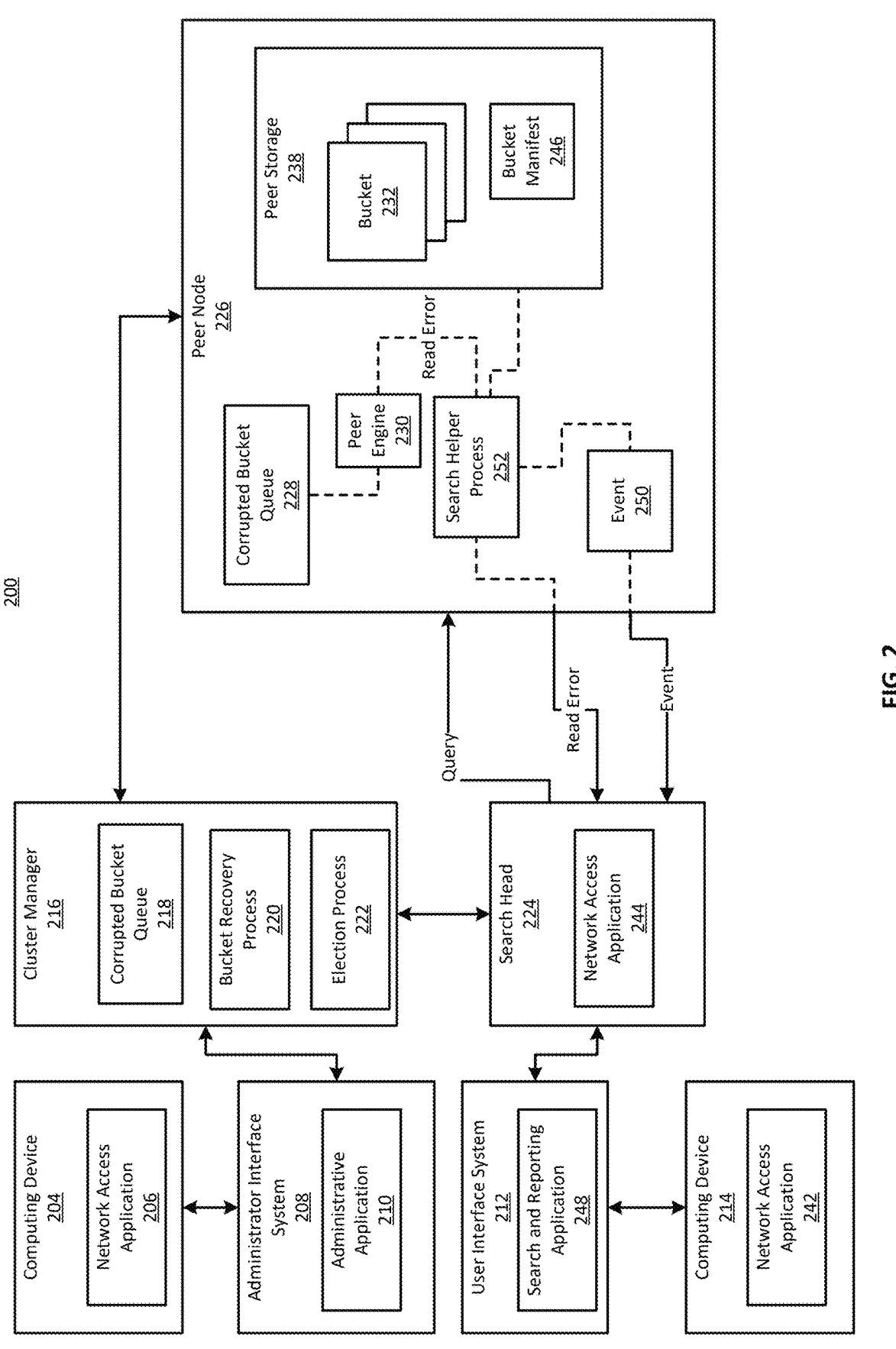
FIG. 2 illustrates an example diagram of a portion of a peer cluster for recovering corrupt buckets.

FIG. 2 is a diagram illustrating a portion of the peer cluster components, data structures and request originators of a bucket recovery operation. FIG. 2 shows a cluster manager 216, search head 224 and a peer node 226 of a peer cluster. The cluster manager 216 and the search head 224 are the same as the like-named components described above in FIG. 1. The peer node 226 is representative of multiple peer nodes of the peer cluster shown in FIG. 1. The cluster manager 216 is communicatively coupled to an administra- tor interface system 208. The administrative interface sys- tem 208 is operably and communicably coupled to a com- puting device 204. The computing device 204 and administrative interface system 208 may be the same or similar to the computing device and user interface system described in reference to FIG. 11. The administrative appli- cation 210 may be the same or similar to the monitoring console described in reference to FIG. 9.

In one or more embodiments, the administrative applica- tion 210 that is available through the administrative interface system 208 is configured to send a request that initiates a bucket recovery operation is sent to the cluster manager 216. The network access application 206 executing on a computing device 204 may have an interface for an administrator to input the request. For example, the network access application 206 may have a search field provided by the administrative application 210. For example, an administrator may input the request into a search field and the administrative application 210 may send a request to the cluster manager via Representational State Transfer (REST) calls, Hypertext Transfer Protocol (HTTP) requests, application programming interface (API) calls, a command line instruction (CLI), or a Web User Interface (Web UI) call.

In one or more implementations, the administrative application 210 may include the functionality of the user interface system 212 executing on the computing device 214. In one or more alternative implementations, the user interface system 212 and search and reporting application 248 may respectively include the functionality of the administrator interface system 208 and the administrative application 210.

Figure 10:
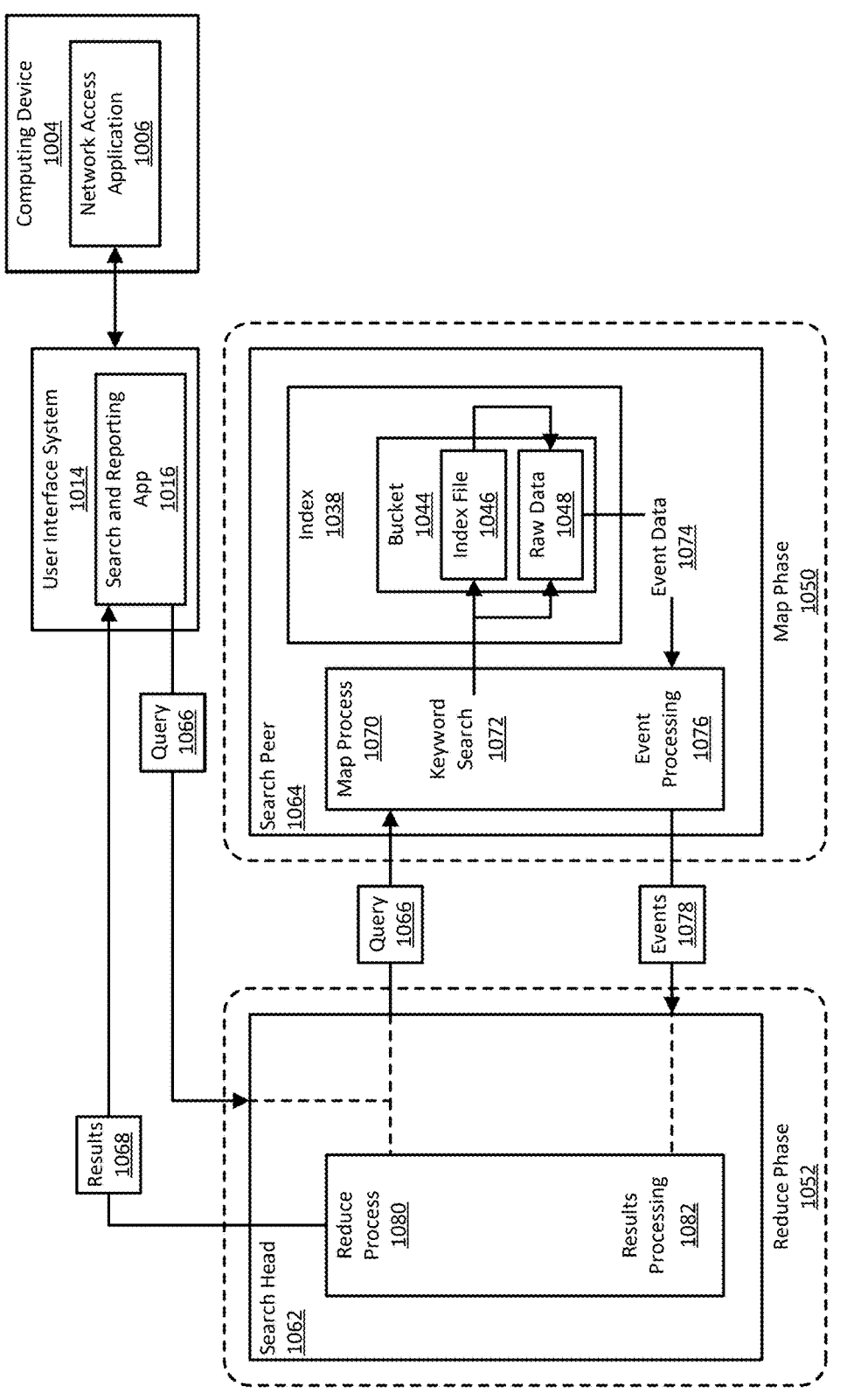
FIG. 10 illustrates an example schematic diagram of search in the data intake and query system in which FIG. 2 may be implemented.

The user interface system 212 and the search and reporting application 248 may be the same or similar to the like-named components described in reference to FIG. 10. The computing device 214 and the network access application 242 are the same or similar to the like-named components described in reference to FIG. 10. In one implementation, the search head 224 receives a search query from the search and reporting application 248 executed by the user interface system 212. The search head 224 sends the query to the peer node and receives one or more of the events 250 as the search result. The event 250 is a discrete unified data item that may have one or more fields. In one or more embodiments, an event is a record of an action or occurrence by software and is associated with a timestamp identifying the time of the action or occurrence. For example, the event may be raw machine data associated with a timestamp. The event may be the same as the like-named component described in reference to FIG. 10. In some cases, the search request results in an error. The error may be indicative of a corrupt bucket.

The peer node 226 of FIG. 2 shows components and data structures within the peer node configured for a bucket recovery operation. The peer node 226 includes peer storage 238. The peer storage 238 directly stores buckets. The peer storage 238 may be multiple storage systems provided by a third-party storage vendor. The multiple storage systems may be from different vendors and may be heterogeneous. The heterogeneous storage systems may have heterogeneous protocols and interfaces for storing data on the storage system(s) of the peer storage 238. Some of the storage systems may be from the same vendor and of the same type. Further, some of the storage systems may have the same or overlapping physical devices. The actual physical device and underlying storage may be abstracted from the peer node. The peer storage 238 includes multiple buckets 232 and a bucket manifest 246. An example of the buckets 232 is bucket 944 described in reference to FIG. 9. The bucket manifest 246 is described in further detail in reference to FIG. 3.

The peer node 226 of FIG. 2 further includes a corrupted bucket queue 228, a peer engine 230, and a search helper process 252. In one or more implementations, the search helper process 252 may be triggered by a search query from the search head. The search helper process 252 orchestrates the search query received from the search head and reads the buckets in the peer storage, gathers the event(s) 250 responsive to the search query, and sends the event(s) 250 retrieved from the buckets to the search head. The peer engine 230 includes functionality for data collection and indexing capabilities of the peer node 226. In one or more implementations, the search helper process 252 may not be able to read a bucket. Accordingly, the search helper process 252 may send a read error notification to the peer engine 230. Additionally, or alternatively, a read error may be sent by the search helper process 252 back to the search head. The read error notification to the peer engine 230 indicates that a read error occurred in reading from a bucket. The peer engine 230 updates the corrupted bucket queue 228 of the peer node 226. The corrupted bucket queue 228 of the peer node 226 is a data structure that stores information pertaining to the corrupted buckets in the peer node 226. In one or more implementations, the corrupted bucket queue is periodically transmitted by the peer node 226 to the cluster manager 216. The process of notifying the cluster manager 216 of the corrupted buckets in the corrupted bucket queue 228 is described in further detail with reference to FIG. 5.

Figure 3:
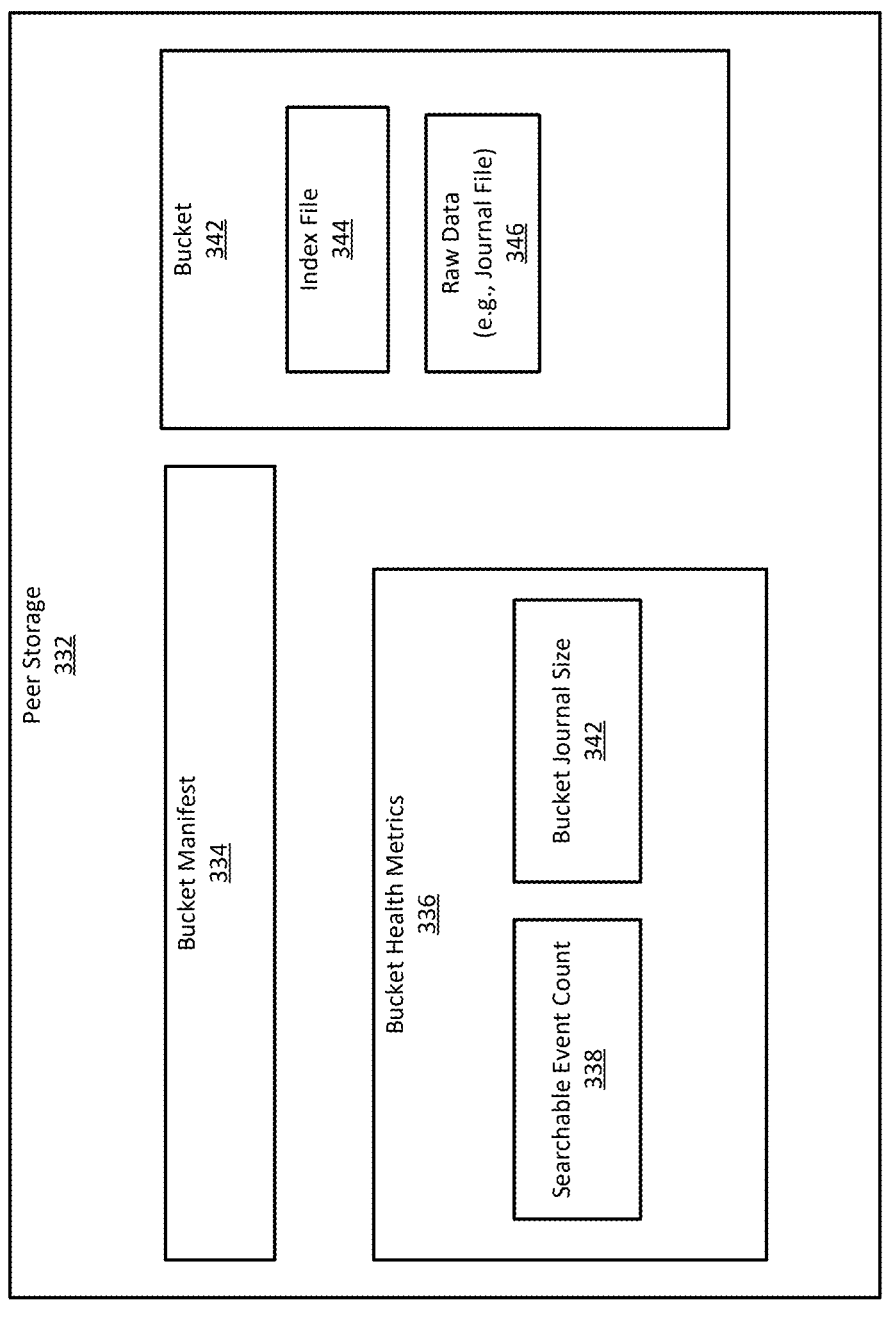
FIG. 3 illustrates an example diagram of a peer storage system corresponding to a peer node.

FIG. 3 is a diagram illustrating portions of the bucket 342 and the bucket manifest 334 stored in the peer storage 332. The bucket 342 and bucket manifest 334 are the same as the like-named components described above in FIG. 2. Further, the bucket 342, including the index file 344 and the raw data (e.g., journal file) 346 is an implementation of the bucket 944 and like-named components described in reference to FIG. 9.

The bucket manifest 334 is an index-level bucket manifest file including a list of all the buckets stored in the peer storage 332 of a peer node corresponding to an index. An entry in the bucket manifest 334 corresponds to a bucket of both searchable and non-searchable types. In one or more implementations, the bucket manifest entry corresponding to a searchable bucket may include multiple fields. For example, a field in the bucket may be a searchable event count. The searchable event count may be the number of events in the bucket. Other fields may include the location of the bucket, the number of unique hosts in the bucket, the date of the creation of the bucket, a bucket journal size of the bucket journal file (the raw data file corresponding to the bucket, measured in bytes), and other information pertaining to the bucket. The bucket health metrics 336 is a data structure including at least a subset of the fields of a bucket manifest entry corresponding to a bucket. In one or more implementations, the bucket health metrics 336 are updated after a rebuild process of a bucket is completed within the peer node. In particular, the searchable event count 338, and a bucket journal size 342, as shown in FIG. 3, may be included in the bucket health metrics 336 data structure. In one or more implementations, the searchable event count 338, and the bucket journal size 342 are individually retrievable by command line instructions (CLI), API calls, or REST and/or HTTP calls/requests issued from the administrative application shown in FIG. 2. Notably, although the bucket health metric data structure includes fields that may also be found in the bucket manifest entry, the bucket health metric data structure may be updated independently of the bucket manifest entry. The updating of the bucket health metric may be implemented by updating the searchable event count and the bucket journal size, for example, from bucket metadata and/or peer node system process calls.

FIG. 4 is a flowchart illustrating an example process 400 for a bucket recovery operation by a cluster manager in a peer cluster.

The example process 400 can be implemented, for example, by a computing device that comprises a processor and a non-transitory computer-readable medium. The non-transitory computer readable medium can be storing instructions that, when executed by the processor, can cause the processor to perform the operations of the illustrated example process 400. Alternatively, or additionally, the example process 400 can be implemented using a non-transitory computer-readable medium storing instructions that, when executed by one or more processors, cause the one or more processors to perform the operations of the example process 400 of FIG. 4.

In one or more implementations, various steps of the example process 400 may be performed by one or more of the cluster manager and the peer nodes of the system 100 shown in FIG. 1. Further, the steps of the example process 400, may be performed in different order, in parallel, and in a distributed computing environment.

The example process 400 starts at Block 402, when the cluster manager receives a notification of a corrupted bucket. In one implementation, the notification originates from an administrative application as shown in FIG. 2. For example, the administrator of the peer cluster may trigger a REST API of the form, "/services/cluster/manager/buckets/<bucket_id>/fix_corrupt_bucket" in the administrative application shown in FIG. 2. Subsequently, the cluster manager receives the request.

In response, the cluster manager enqueues the bucket identifier in the corrupted bucket queue corresponding to the cluster manager. Subsequently, the cluster manager may return an acknowledgement to the administrative application.

Responsive to the notification, the cluster manager may select the subset of peer nodes that each store a bucket copy corresponding to the corrupted bucket in an example implementation. Notably, the bucket copies that are selected may also be corrupted, or not corrupted. The selection is based on the peer nodes each storing the bucket copy. Further bucket recovery processing of the corrupted bucket is only performed with the selected peer nodes.

In Block 404, the cluster manager sends a request to the selected subset of peer nodes of the peer cluster to report bucket health metrics corresponding to bucket copies of the corrupted bucket stored on the peer node. In one implementation, the cluster manager sends individual requests to the peer nodes asynchronously. For example, the cluster manager may execute a background service thread (e.g., as a lightweight process) or process that monitors the corrupted bucket queue. A new entry in the corrupted bucket queue may trigger the background service thread or process to check the peer nodes that store the bucket identified in the corrupted bucket queue and send individual requests to the respective peer nodes to report back with the bucket health metrics of the buckets present in the respective peer storages of the peer nodes.

In Block 406, the cluster manager obtains the bucket health metrics corresponding to the bucket copies of the corrupted bucket stored in the selected subset of peer nodes of the peer cluster. In one implementation, the cluster manager background process monitors the selected subset of peer nodes for the response to the request sent by the cluster manager in Block 404. Further, in the duration of time that is taken by the peer nodes to respond to the request for bucket health metrics from the cluster manager, other background repair and recovery requests for the peer nodes (e.g., search factor, replication factor, etc.) may be suspended, or enqueued until the bucket health metrics are obtained from the peer nodes.

In Block 408, the election operation of electing a bucket copy as the best available copy is performed by the cluster manager. Specifically, a bucket copy with a highest searchable event count value is elected as a canonical bucket copy, whereby the canonical bucket copy is stored on an elected peer node. In one implementation, the cluster manager obtains the bucket health metrics corresponding to the bucket copies stored in the subset of peer nodes. Further, the cluster manager selects the bucket copy having the highest searchable event count extracted from the bucket health metrics sent by the subset of peer nodes. The cluster manager designates the bucket copy corresponding to the highest searchable event count as the canonical bucket copy of the bucket. The canonical bucket copy is thereby designated to be uncorrupted. The peer node having the canonical bucket copy is thereby the elected peer node for the purposes of the bucket. In some instances where there are two or more identical bucket copies with the highest searchable event count, then all of such bucket copies are excluded from being discarded and one of them will be chosen as the canonical bucket copy for replication. In one or more implementations, the election operation of the cluster manager is handled by the election process shown in FIG. 1.

Subsequently, in Block 410, the cluster manager sends a replicate command to the elected peer node storing the canonical bucket copy to replicate the canonical bucket copy across the peer cluster. In one or more implementations, the canonical bucket copy is replicated corresponding to the replication factor. For example, if the replication factor of the peer cluster is 5, then there are five peer nodes included in the peer cluster, and the canonical bucket copy is replicated across the five peer nodes. The peer nodes receiving the replica of the canonical bucket copy may be the same or different than the selected subset of peer nodes storing a bucket copy corresponding to the corrupted bucket. Further, the cluster manager, precluding or with the exception of, the elected peer node storing the canonical bucket copy, sends instructions to the remaining peer nodes storing the remaining bucket copies of the corrupted bucket to discard the copies. In an example implementation, the cluster manager selectively sends the discard instruction to the peer nodes storing bucket copies that have searchable event counts that are less than the searchable event count of the canonical bucket copy. The instruction from the cluster manager to discard the copies causes the peer nodes receiving the discard instruction to mark the bucket copy as "discarded". Thereby, a bucket copy corresponding to the corrupted bucket that is detected as corrupted is prevented from being replicated in the example implementation. Thus, the peer nodes marking their bucket copies as "discarded" obtain clean copies of the canonical bucket copy from the peer node storing the canonical bucket copy. Bucket copies marked as "discarded" may be deleted from storage in accordance with the reclamation policy of the peer node.

FIG. 5 is a flowchart illustrating an example process 500 for a bucket recovery operation by a cluster manager in a peer cluster when triggered by a peer node reporting a corrupted bucket.

The example process 500 can be implemented, for example, by a computing device that comprises a processor and a non-transitory computer-readable medium. The non-transitory computer readable medium can be storing instructions that, when executed by the processor, can cause the processor to perform the operations of the illustrated example process 500. Alternatively, or additionally, the example process 500 can be implemented using a non-transitory computer-readable medium storing instructions that, when executed by one or more processors, cause the one or more processors to perform the operations of the example process 500 of FIG. 5.

In one or more implementations, various steps of the example process 500 may be performed by one or more of the peer nodes and the cluster manager of the system 100 shown in FIG. 1. Further, the steps of the example process 500 may be performed in different order, in parallel, and in a distributed computing environment.

The example process 500 starts at Block 502, at a peer node in the peer cluster. In Block 502, a read error notification error identifying a bucket from the search helper process corresponding to the peer node is obtained by the peer engine corresponding to the peer node. The read error notification identifies a bucket stored in the peer storage corresponding to the peer node. In one or more implementations, the search helper process may receive a search query from a search head of the peer cluster. The search helper process may attempt to read one or more buckets stored in the peer storage of the peer node. If the search helper process encounters an error while accessing, or reading, the bucket stored in the peer storage of the peer node, the search helper process may send the read error notification to the peer engine of the peer node.

In Block 504, at the peer node, the peer engine of the peer node handles the read error notification. More specifically, the peer engine of the peer node identifies the bucket corresponding to the information included in the read error notification and adds the bucket to the corrupted bucket queue.

In Block 506, the peer node sends enqueued corrupted buckets in the corrupted bucket queue to the cluster manager. In one or more implementations, a background thread or process executing on the peer node handles the sending of the corrupted bucket queue of the peer node to the cluster manager. In one implementation, the background thread or process sends a representational state transfer (REST) based hypertext transfer protocol (HTTP) request to the cluster manager with the corrupted bucket queue.

In Block 508, the cluster manager receives the enqueued corrupted buckets of the corrupted bucket queue from the peer node and adds the corrupted bucket identifiers to the corrupted bucket queue of the cluster manager. Further, in Block 510, the cluster manager schedules bucket recovery process instances to be executed. In one or more implementations, the cluster manager schedules bucket recovery process instances to run concurrently below a concurrent instance threshold. The concurrent instance threshold is the maximum number of concurrent instances of executing bucket recovery processes for corrupted buckets. The concurrent instance threshold may be set in configuration parameters of the cluster manager, or by an administrator via the administrative application. This threshold is set to safeguard the system against overuse of the computing resource.

In Block 512, the peer node receives a request from the cluster manager to report bucket health metrics corresponding to corrupted bucket copies stored in the respective peer storage. In one or more implementations, the rebuild process may configured to ignore any read errors with a goal to obtain the best possible searchable event count, being fault tolerant to read errors that may be otherwise fixable. To this end, the peer node initiates bucket rebuilds of the corrupted bucket copies. In one or more implementations, the rebuild process entails a re-generation of the index file (e.g., a tsidx file) corresponding to the bucket, if the bucket was previously searchable, and a generation of a new index file corresponding to the bucket if the bucket is non-searchable.

Further, the peer node may receive the requests from the cluster manager via one or more REST calls.

In Block 514, upon completion of the bucket rebuild process, the peer node sends a report to the cluster manager including updated bucket health metrics corresponding to the rebuilt bucket copy, and the bucket rebuild process status, that is, status parameters corresponding to the bucket rebuild process performed by the peer node. In particular, the bucket health metrics include the updated bucket journal size, the updated searchable event count of the bucket. Further, a status report on the rebuild process is also sent by the peer node to the cluster manager. In one or more implementations, the status report of the rebuild process may include information about the bucket health metric, including the searchable event count read from the bucket metadata files and the actual bucket journal size retrieved by a peer node system process call and other information that may not be included in the bucket manifest.

In certain cases, the peer node may initiate a corrupted bucket notification. For example, instead of the read error described in Block 502, during a restart, add, or rejoin operation between the peer node and the cluster manager, or a restart process of the cluster manager and subsequent rejoin of the peer node to the peer cluster, the peer node may determine a mismatch between the bucket journal size retrieved from a peer node system process call, and a bucket journal size field entry in the bucket manifest entry corresponding to a bucket. Notably, the bucket is a "warm" bucket. The status of buckets is described in further detail in reference to FIG. 9. In this situation, the peer node initiates a corrupted bucket notification. In a second cases, other information present in a header section of the bucket may not be readable, causing the peer node to initiate a corrupted bucket notification. For example, if the peer node is unable to read some of the fields (e.g., site header) of the bucket's journal information, the peer node initiates a corrupt bucket notification. The second case is not limited to "warm" buckets. In one or more implementations, the corrupt bucket may be enqueued in the corrupted bucket queue corresponding to the peer node and the processing is performed as described above. In an example implementation, a flag or parameter indicating a "pending-fix" may be sent to the cluster manager during a bucket batch-adding process conducted by the cluster manager during the restart/add/rejoin operation between the peer node and the cluster manager.

In one or more implementations, if two or more buckets report the same searchable event count but different bucket journal sizes, the bucket recovery operation may be halted. The bucket recovery operation may be further reported to an administrative application dashboard as having failed, requiring a manual intervention and rebuild of the bucket copies. Furthermore, if a peer node restarts during the bucket recovery operation is running, the bucket recovery operation may be re-attempted by the cluster manager by sending a request to the peer node when the peer node resumes its normal operation. Additionally, if there is an occurrence of an exceptional condition during the bucket recovery operation (e.g., more than a threshold or all peer nodes return a rebuild process error), the cluster manage sends an alert to a dashboard of the administrative application for a manual check.

Figure 6:
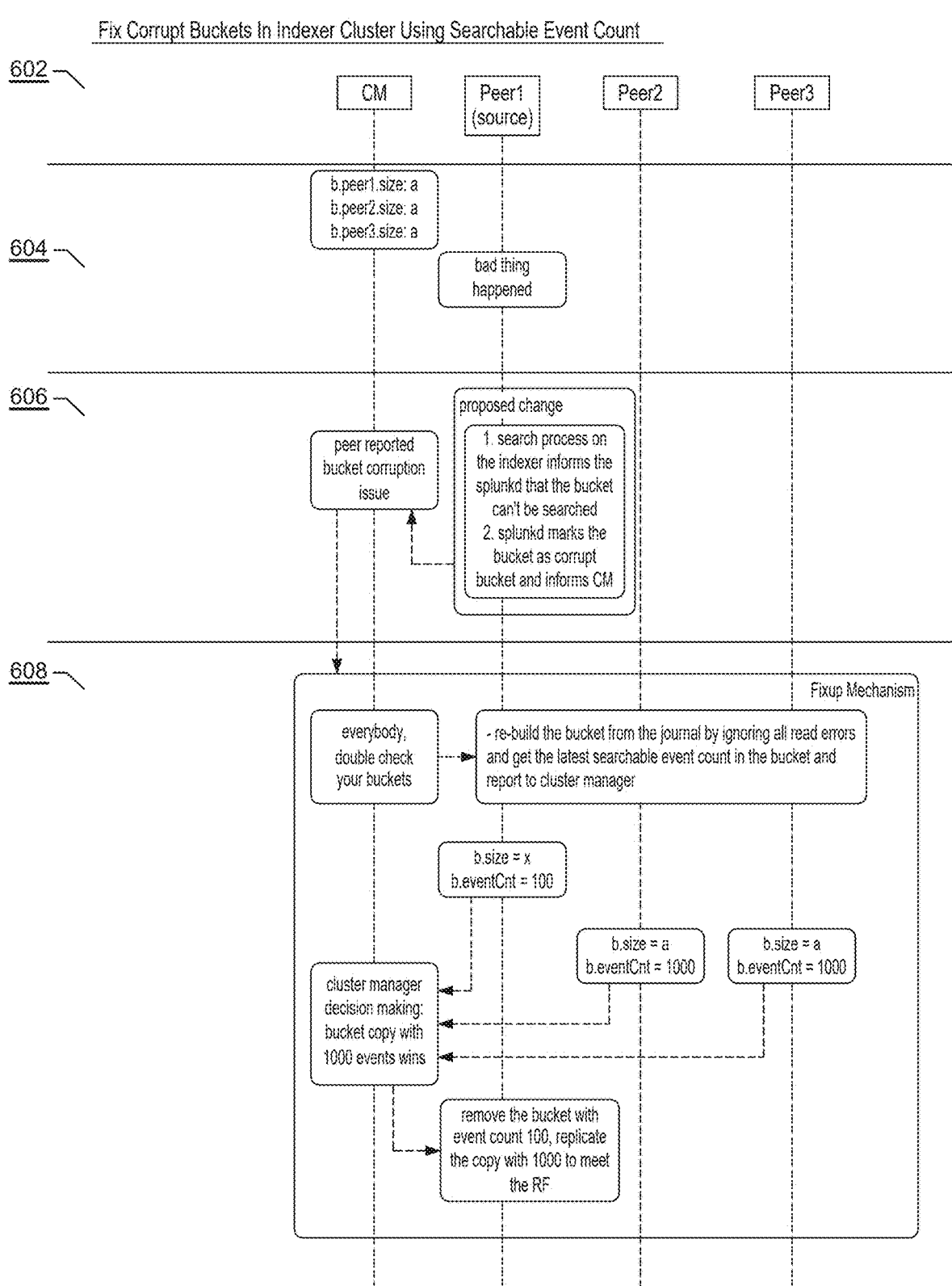
FIG. 6 illustrates an example timing diagram of the interaction between different components of the peer cluster in the bucket recovery operation.

FIG. 6 illustrates an example timing diagram for a bucket recovery operation triggered by a peer node sending a notification to the cluster manager. The section referenced by reference numeral 602 shows the cluster manager and three peer nodes, namely, peer 1, peer 2 and peer 3 of a peer cluster. Further, peer 1 is the peer node shown to be the source of a notification of a corrupt bucket.

The section of the diagram of FIG. 6 referenced by reference numeral 604 shows that the cluster manager maintains a list of bucket sizes corresponding to a bucket b, stored in the peer nodes. At the peer node peer 1, an adverse event occurs, and is reported to the cluster manager.

In the section of the diagram of FIG. 6 referenced by reference numeral 606, the cluster manager notes that there is a bucket corruption issue.

Alternatively, or additionally, a search helper process executing on peer 1 informs the peer engine of peer1 that the bucket cannot be searched. The peer engine of peer1 marks the bucket as corrupt. The peer node reports the corrupt bucket back to the cluster manager.

In the section of the diagram of FIG. 6 referenced by reference numeral 608, the bucket recovery operation is shown. The cluster manager sends a request to the individual peer nodes of the peer cluster to check the buckets. More particularly, the cluster manager sends a request to the peer nodes of the peer cluster storing bucket copies corresponding to the corrupted bucket to report back with bucket health metrics, as described above with reference to FIG. 4. The peer nodes receive the request and trigger the rebuild operation for the respective copies of the corrupted bucket stored on the respective peer nodes. In the example shown, peer 1 rebuilds the bucket copy and the updated bucket size as "x". Further, the updated searchable event count value is 100. On the other hand, peer nodes peer 2 and peer 3 each return the updated bucket sizes of their respective bucket copies as "a" and the updated searchable event count values as 1000. Subsequently, the cluster manager receives the individual bucket sizes and searchable event counts corresponding to the stored copies of the bucket on the respective peer nodes.

When performing the election operation, the cluster manager picks the bucket copy with a searchable event count value of 1000. In one implementation, when two or more buckets have the same searchable event count values, the cluster manager may identify the buckets as being canonical buckets and only send discard instructions to peer nodes storing copies of the bucket that have searchable event counts less than the searchable event count of the canonical bucket copy.

Figure 7A:
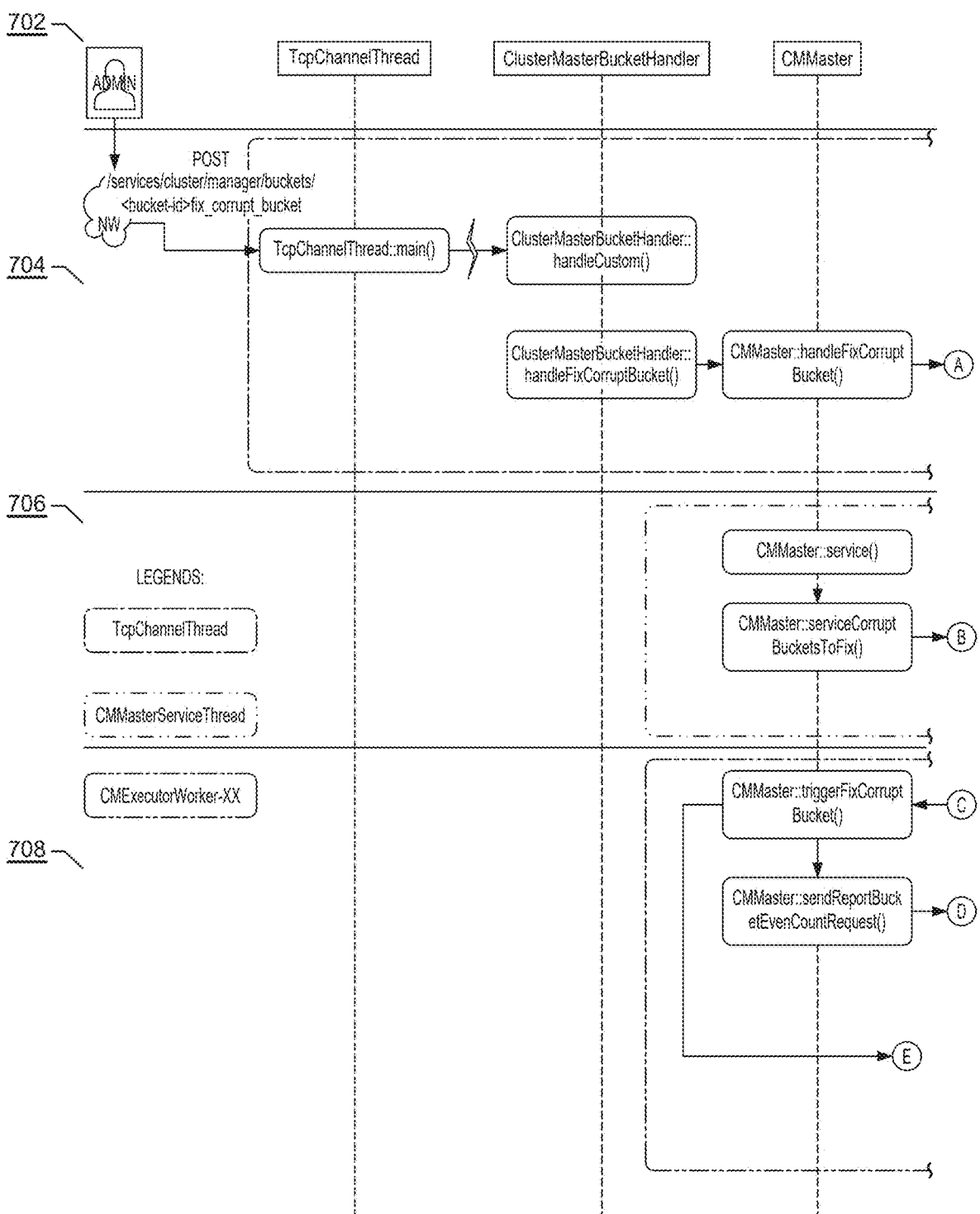
FIG. 7A and FIG. 7B illustrate an example implementation architecture diagram of actions of different components of the cluster manager in response to a bucket recovery request from an administrative application.
Figure 7B:
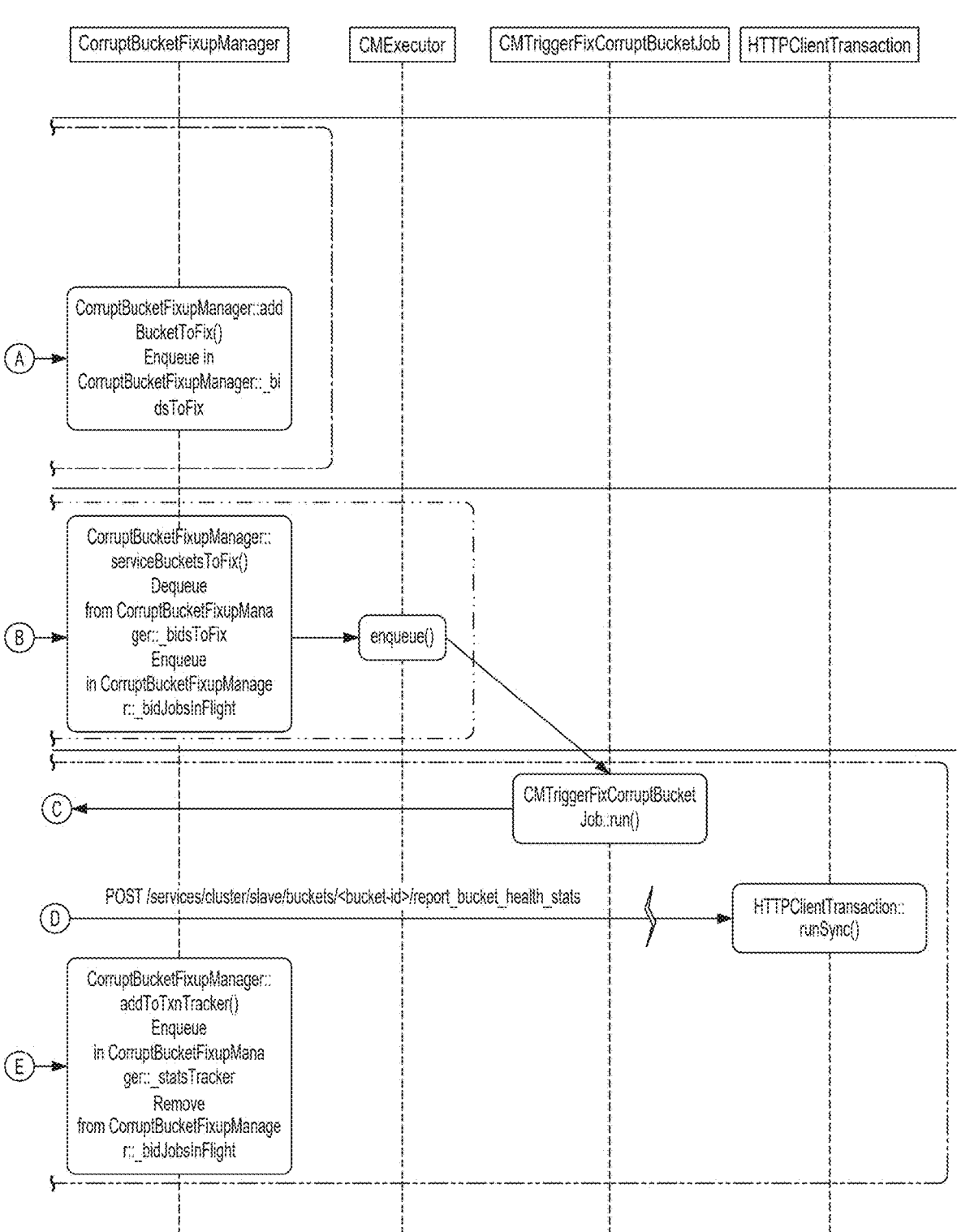

FIGS. 7A and 7B illustrate an example implementation architecture diagram for a cluster manager handling a bucket recovery operation in response to a request originating from an administrative application. FIG. 7B is a continuation of FIG. 7A, with off-page reference A continuing to show section 704 in FIG. 7B, off-page reference B continuing to show section 706 in FIG. 7B, and off-page references C, D and E, continuing to show section 708 in FIG. 7B. In the section of the diagram of FIG. 7A referenced by reference numeral 702, the administrator is shown interacting with the cluster manager. The section referenced by reference numeral 702 also shows the processes executing in the cluster manager that play a role in the bucket recovery operation, namely, a cluster master bucket handler, a corrupt bucket fixup manager, a cluster manager master orchestrator, and a cluster manager executor. The cluster manager also includes a background process that triggers a fixup corrupt bucket job and a REST based HTTP client transaction handler. Further, the architecture diagram also shows three threads executing on the cluster manager, namely, the transmission control protocol (TCP) channel thread, the cluster manager master service thread, and the cluster manager executor worker thread.

In the section of the diagram of FIG. 7A referenced by reference numeral 704, the administrative application interacts with the TCP channel thread to send the request for a bucket recovery operation. The cluster master bucket handler, the cluster manager master orchestrator and the corrupt bucket fixup manager components perform the task of enqueuing the corrupt bucket in the "to-fix" queue, shown in FIG. 7B, in the section marked by off-page reference A.

In parallel, the cluster manager master service thread shown in the section of the diagram of FIG. 7A referenced by reference numeral 706 is triggered by the cluster manager master orchestrator to schedule the instance of the bucket recovery process. In one or more implementations, the scheduling entails dequeuing the bucket from the "to-fix" queue and enqueueing the bucket into a "jobs-in-flight" queue while the job is executed within the executor thread context. The enqueue operation shown in FIG. 7B in the section marked by off-page reference B triggers the cluster manager corrupt bucket job (shown by off-page reference C in FIG. 7B) to execute. Once the executor thread sends all the bucket health metrics reporting requests to all the peers, the bucket is removed from the "jobs-in-flight" list to a "jobs-stats-tracker" list. The cluster manager monitors the total size of the "jobs-in-flight" queue and the "jobs-stats-tracker" list to ensure that concurrently executing jobs stay within the current instance threshold. The "jobs-stats-tracker" list is further used to track the responses of the bucket health metrics from the respective peer nodes.

A cluster manager execution worker thread is triggered by the cluster manager corrupt bucket job to send a request to the peer nodes, namely, send a bucket health metric report. As shown in section 708 of FIG. 7A, the cluster manager executor worker thread sends the request to the peer node(s). The request is sent as a REST call, "POST/services/cluster/slave/buckets/<bucket_id/report_health_stats" to the peer node, shown by off-page reference D in FIG. 7B). Subsequently the executor worker thread waits for a request acknowledgement response from the peer node. The results of from the peer node are received asynchronously via a separate endpoint, for example, '/services/cluster/manager/buckets/<bucket_id>/report_bucket_health_stats' Once the request is sent, the executor worker thread dequeues the bucket from the "jobs-inflight" queue and enqueues the bucket in the corrupt bucket fixup manager's "jobs-stats-tracker" list, (shown by off-page reference E in FIG. 7B).

On the peer node side, the peer nodes receive the requests from the cluster manager. The request to report bucket health statistics (stats) triggers the peer nodes to asynchronously perform a rebuild operation on the bucket(s). In one or more implementations, read error statuses encountered by the rebuild process if any, are ignored with a goal to obtain the maximum possible searchable event count. The peer node reports the status of the rebuild operation upon completion to the cluster manager, in addition to the bucket health metrics, for example, by calling REST EP '/services/cluster/manager/buckets/<bucket_id>/report_bucket_health_stats' on the cluster manager. When the peer nodes of the peer cluster complete the respective rebuild operations and the cluster manager receives the respective operation status and bucket health metrics from the individual peer nodes, the cluster manager performs the election operation.

As described above, the cluster manager selects the bucket copy with the highest event count value as the canonical bucket copy. Further, the cluster manager sends instructions to the peer nodes storing the bucket copies with a lesser event count to discard the bucket copies, with the exception of the peer node storing the canonical bucket copy. Subsequently, the cluster manager sends a replicate command to the peer node storing the canonical bucket copy and the canonical bucket copy is replicated across the peer cluster.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively, or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest, and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 8:
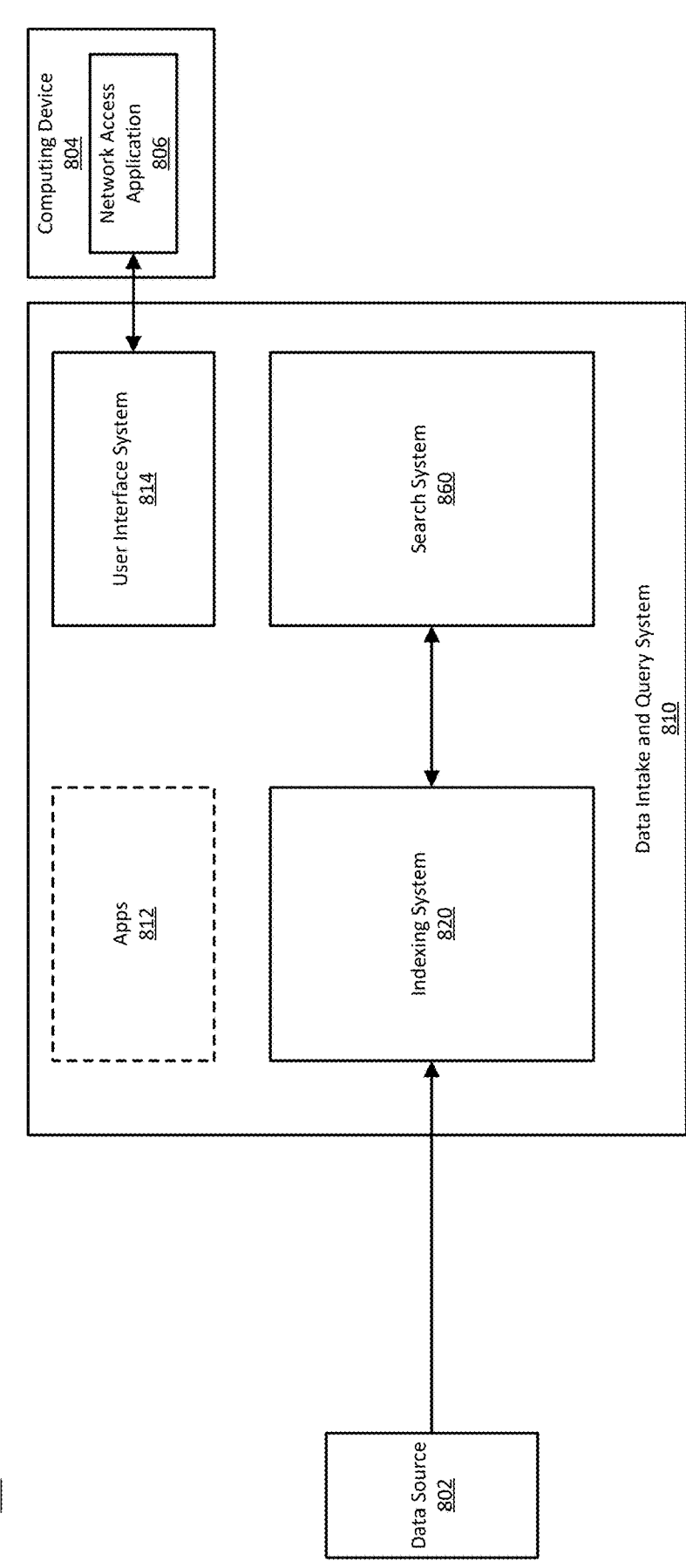
FIG. 8 illustrates a schematic diagram of an on-premises data intake and query system in which FIG. 2 may be implemented.

FIG. 8 is a block diagram illustrating an example computing environment 800 that includes a data intake and query system 810. The data intake and query system 810 obtains data from a data source 802 in the computing environment 800 and ingests the data using an indexing system 820. A search system 860 of the data intake and query system 810 enables users to navigate the indexed data. Though drawn with separate boxes in FIG. 8, in some implementations the indexing system 820 and the search system 860 can have overlapping components. A computing device 804, running a network access application 806, can communicate with the data intake and query system 810 through a user interface system 814 of the data intake and query system 810. Using the computing device 804, a user can perform various operations with respect to the data intake and query system 810, such as administration of the data intake and query system 810, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 810 can further optionally include apps 812 that extend the search, analytics, and/or visualization capabilities of the data intake and query system 810.

The data intake and query system 810 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 810 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 810 can be executed on a single computing device, or execution of the program code can be distributed over multiple computing devices. For example, the program code can include instructions for both indexing and search components (which may be part of the indexing system 820 and/or the search system 860, respectively), which can be executed on a computing device that also provides the data source 802. As another example, the program code can be executed on one computing device, where execution of the program code provides both indexing and search components, while another copy of the program code executes on a second computing device that provides the data source 802. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 802 of the computing environment 800 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 802 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 820 obtains machine data from the data source 802 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 820 does not require prior knowledge of the structure of incoming data (e.g., the indexing system 820 does not need to be provided with a schema describing the data). Additionally, the indexing system 820 retains a copy of the data as it was received by the indexing system 820 such that the original data is always available for searching (e.g., no data is discarded, though, in some examples, the indexing system 820 can be configured to do so).

The search system 860 searches the data stored by the indexing 820 system. As discussed in greater detail below, the search system 860 enables users associated with the computing environment 800 (and possibly also other users) to navigate the data, generate reports, and visualize search results in "dashboards" output using a graphical interface. Using the facilities of the search system 860, users can obtain insights about the data, such as retrieving events from an index, calculating metrics, searching for specific conditions within a rolling time window, identifying patterns in the data, and predicting future trends, among other examples. To achieve greater efficiency, the search system 860 can apply map-reduce methods to parallelize searching of large volumes of data. Additionally, because the original data is available, the search system 860 can apply a schema to the data at search time. This allows different structures to be applied to the same data, or for the structure to be modified if or when the content of the data changes. Application of a schema at search time may be referred to herein as a late-binding schema technique.

The user interface system 814 provides mechanisms through which users associated with the computing environment 800 (and possibly others) can interact with the data intake and query system 810. These interactions can include configuration, administration, and management of the indexing system 820, initiation and/or scheduling of queries that are to be processed by the search system 860, receipt or reporting of search results, and/or visualization of search results. The user interface system 814 can include, for example, facilities to provide a command line interface or a web-based interface.

Users can access the user interface system 814 using a computing device 804 that communicates with data intake and query system 810, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 800. For example, a person can log in as a particular user and, using the user's digital information, can access the data intake and query system 810. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 804 can provide a human-machine interface through which a person can have a digital presence in the computing environment 800 in the form of a user. The computing device 804 is an electronic device having one or more processors and a memory capable of storing instructions for execution by the one or more processors. The computing device 804 can further include input/output (I/O) hardware and a network interface. Applications executed by the computing device 804 can include a network access application 806, such as a web browser, which can use a network interface of the client computing device 804 to communicate, over a network, with the user interface system 814 of the data intake and query system #A110. The user interface system 814 can use the network access application 806 to generate user interfaces that enable a user to interact with the data intake and query system #A110. A web browser is one example of a network access application. A shell tool can also be used as a network access application. In some examples, the data intake and query system 810 is an application executing on the computing device 806. In such examples, the network access application 806 can access the user interface system 814 without going over a network.

The data intake and query system 810 can optionally include apps 812. An app of the data intake and query system 810 is a collection of configurations, knowledge objects (a user-defined entity that enriches the data in the data intake and query system 810), views, and dashboards that may provide additional functionality, different techniques for searching the data, and/or additional insights into the data. The data intake and query system 810 can execute multiple applications simultaneously. Example applications include an information technology service intelligence application, which can monitor and analyze the performance and behavior of the computing environment 800, and an enterprise security application, which can include content and searches to assist security analysts in diagnosing and acting on anomalous or malicious behavior in the computing environment 800.

Though FIG. 8 illustrates only one data source, in practical implementations, the computing environment 800 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 800, the data intake and query system 810 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud and has digital access to resources provided by the computing devices only to the extent that such access is enabled by the provider entity.

In some implementations, the computing environment 800 can include on-prem and cloud-based computing resources, or only cloud-based resources. For example, an entity may have on-prem computing devices and a private cloud. In this example, the entity operates the data intake and query system 810 and can choose to execute the data intake and query system 810 on an on-prem computing device or in the cloud. In another example, a provider entity operates the data intake and query system 810 in a public cloud and provides the functionality of the data intake and query system 810 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 810. In some implementations, the entity providing the data intake and query system 810 is itself subscribing to the cloud services of a cloud service provider. As an example, a first entity provides computing resources under a public cloud service model, a second entity subscribes to the cloud services of the first provider entity and uses the cloud computing resources to operate the data intake and query system 810, and a third entity can subscribe to the services of the second provider entity in order to use the functionality of the data intake and query system 810. In this example, the data sources are associated with the third entity, users accessing the data intake and query system 810 are associated with the third entity, and the analytics and insights provided by the data intake and query system 810 are for purposes of the third entity's operations.

Figure 9:
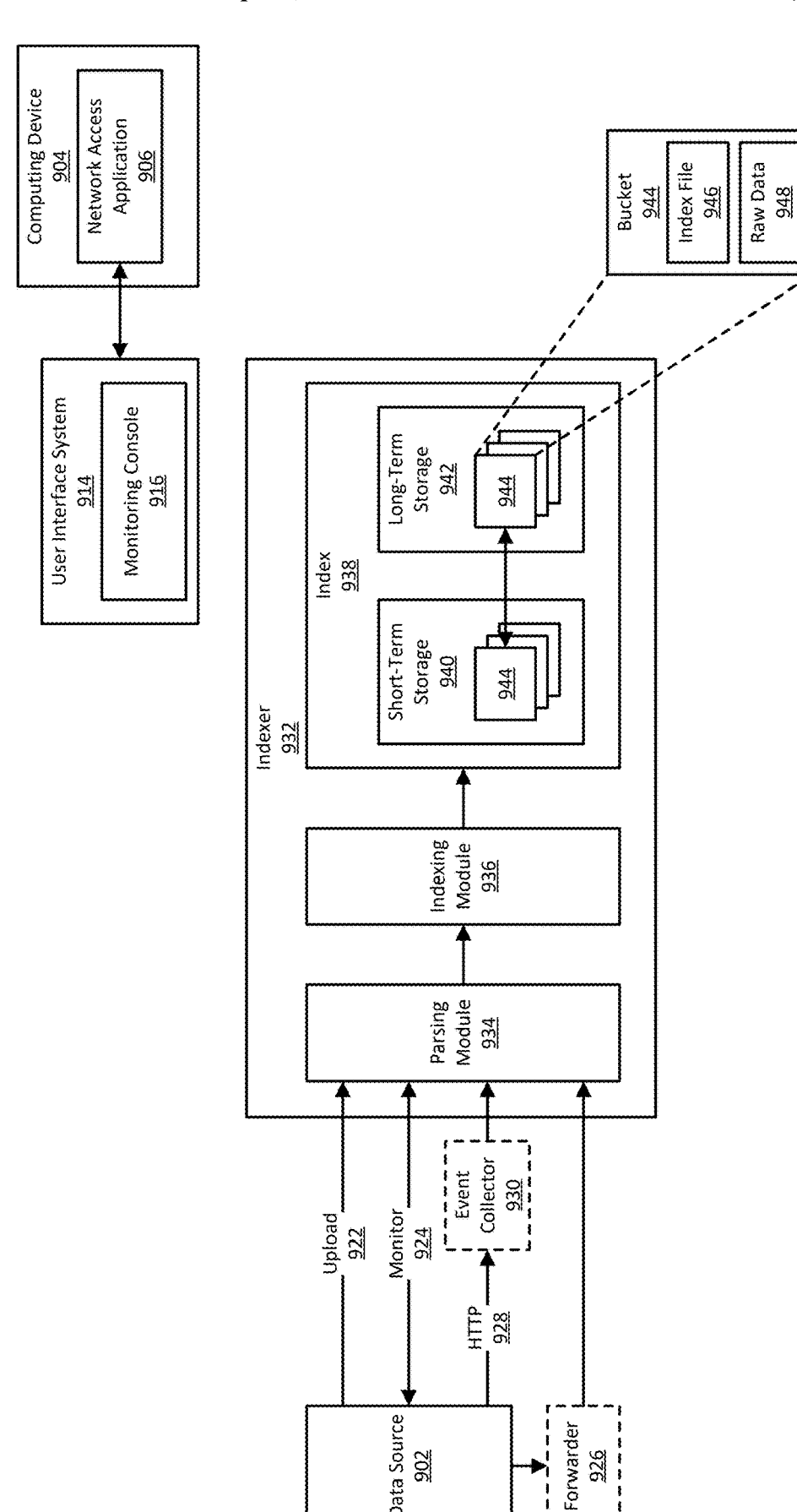
FIG. 9 illustrates an example schematic diagram of data ingest within an indexing system in the data intake and query system in which FIG. 2 may be implemented.

FIG. 9 is a block diagram illustrating in greater detail an example of an indexing system 920 of a data intake and query system, such as the data intake and query system 810 of FIG. 8. The indexing system 920 of FIG. 9 uses various methods to obtain machine data from a data source 902 and stores the data in an index 938 of an indexer 932. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 920 enables the data intake and query system to obtain the machine data produced by the data source 902 and to store the data for searching and retrieval.

Users can administer the operations of the indexing system 920 using a computing device 904 that can access the indexing system 920 through a user interface system 914 of the data intake and query system. For example, the computing device 904 can be executing a network access application 906, such as a web browser or a terminal, through which a user can access a monitoring console 916 provided by the user interface system 914. The monitoring console 916 can enable operations such as: identifying the data source 902 for data ingestion; configuring the indexer 932 to index the data from the data source 932; configuring a data ingestion method; configuring, deploying, and managing clusters of indexers; and viewing the topology and performance of a deployment of the data intake and query system, among other operations. The operations performed by the indexing system 920 may be referred to as "index time" operations, which are distinct from "search time" operations that are discussed further below.

The indexer 932, which may be referred to herein as a data indexing component, coordinates and performs most of the index time operations. The indexer 932 can be implemented using program code that can be executed on a computing device. The program code for the indexer 932 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 932. In some implementations, the indexer 932 executes on the computing device 904 through which a user can access the indexing system 920. In some implementations, the indexer 932 executes on a different computing device than the illustrated computing device 904.

The indexer 932 may be executing on the computing device that also provides the data source 902 or may be executing on a different computing device. In implementations wherein the indexer 932 is on the same computing device as the data source 902, the data produced by the data source 902 may be referred to as "local data." In other implementations the data source 902 is a component of a first computing device and the indexer 932 executes on a second computing device that is different from the first computing device. In these implementations, the data produced by the data source 902 may be referred to as "remote data." In some implementations, the first computing device is "on-prem" and in some implementations the first computing device is "in the cloud." In some implementations, the indexer 932 executes on a computing device in the cloud and the operations of the indexer 932 are provided as a service to entities that subscribe to the services provided by the data intake and query system.

For a given data produced by the data source 902, the indexing system 920 can be configured to use one of several methods to ingest the data into the indexer 932. These methods include upload 922, monitor 924, using a forwarder 926, or using Hypertext Transfer Protocol (HTTP 928) and an event collector 930. These and other methods for data ingestion may be referred to as "getting data in" (GDI) methods.

Using the upload 922 method, a user can specify a file for uploading into the indexer 932. For example, the monitoring console 916 can include commands or an interface through which the user can specify where the file is located (e.g., on which computing device and/or in which directory of a file system) and the name of the file. The file may be located at the data source 902 or may be on the computing device where the indexer 932 is executing. Once uploading is initiated, the indexer 932 processes the file, as discussed further below. Uploading is a manual process and occurs when instigated by a user. For automated data ingestion, the other ingestion methods are used.

The monitor 924 method enables the indexing system 902 to monitor the data source 902 and continuously or periodically obtain data produced by the data source 902 for ingestion by the indexer 932. For example, using the monitoring console 916, a user can specify a file or directory for monitoring. In this example, the indexing system 902 can execute a monitoring process that detects whenever the file or directory is modified and causes the file or directory contents to be sent to the indexer 932. As another example, a user can specify a network port for monitoring. In this example, a monitoring process can capture data received at or transmitting from the network port and cause the data to be sent to the indexer 932. In various examples, monitoring can also be configured for data sources such as operating system event logs, performance data generated by an operating system, operating system registries, operating system directory services, and other data sources.

Monitoring is available when the data source 902 is local to the indexer 932 (e.g., the data source 902 is on the computing device where the indexer 932 is executing). Other data ingestion methods, including forwarding and the event collector 930, can be used for either local or remote data sources.

A forwarder 926, which may be referred to herein as a data forwarding component, is a software process that sends data from the data source 902 to the indexer 932. The forwarder 926 can be implemented using program code that can be executed on the computer device that provides the data source 902. A user launches the program code for the forwarder 926 on the computing device that provides the data source 902. The user can further configure the forwarder 926, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 926 can provide various capabilities. For example, the forwarder 926 can send the data unprocessed or can perform minimal processing on the data before sending the data to the indexer 932. Minimal processing can include, for example, adding metadata tags to the data to identify a source, source type, and/or host, among other information, dividing the data into blocks, and/or applying a timestamp to the data. In some implementations, the forwarder 926 can break the data into individual events (event generation is discussed further below) and send the events to a receiver. Other operations that the forwarder 926 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 930 provides an alternate method for obtaining data from the data source 902. The event collector 930 enables data and application events to be sent to the indexer 932 using HTTP 928. The event collector 930 can be implemented using program code that can be executing on a computing device. The program code may be a component of the data intake and query system or can be a standalone component that can be executed independently of the data intake and query system and operates in cooperation with the data intake and query system.

To use the event collector 930, a user can, for example using the monitoring console 916 or a similar interface provided by the user interface system 914, enable the event collector 930 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 902 as an alternative method to using a username and password for authentication.

To send data to the event collector 930, the data source 902 is supplied with a token and can then send HTTP 928 requests to the event collector 930. To send HTTP 928 requests, the data source 902 can be configured to use an HTTP client and/or to use logging libraries such as those supplied by Java, JavaScript, and .NET libraries. An HTTP client enables the data source 902 to send data to the event collector 930 by supplying the data, and a Uniform Resource Identifier (URI) for the event collector 930 to the HTTP client. The HTTP client then handles establishing a connection with the event collector 930, transmitting a request containing the data, closing the connection, and receiving an acknowledgment if the event collector 930 sends one. Logging libraries enable HTTP 928 requests to the event collector 930 to be generated directly by the data source. For example, an application can include or link a logging library, and through functionality provided by the logging library manage establishing a connection with the event collector 930, transmitting a request, and receiving an acknowledgement.

An HTTP 928 request to the event collector 930 can contain a token, a channel identifier, event metadata, and/or event data. The token authenticates the request with the event collector 930. The channel identifier, if available in the indexing system 920, enables the event collector 930 to segregate and keep separate data from different data sources. The event metadata can include one or more key-value pairs that describe the data source 902 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 930 extracts events from HTTP 928 requests and sends the events to the indexer 932. The event collector 930 can further be configured to send events to one or more indexers. Extracting the events can include associating any metadata in a request with the event or events included in the request. In these implementations, event generation by the indexer 932 (discussed further below) is bypassed, and the indexer 932 moves the events directly to indexing. In some implementations, the event collector 930 extracts event data from a request and outputs the event data to the indexer 932, and the indexer generates events from the event data. In some implementations, the event collector 930 sends an acknowledgement message to the data source 902 to indicate that the event collector 930 has received a particular request form the data source 902, and/or to indicate to the data source 902 that events in the request have been added to an index.

The indexer 932 ingests incoming data and transforms the data into searchable knowledge in the form of events. In the data intake and query system, an event is a single piece of data that represents activity of the component represented in FIG. 9 by the data source 902. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value, and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 932 can include a parsing module 934 and an indexing module 936 for generating and storing the events. The parsing module 934 and indexing module 936 can be modular and pipelined, such that one component can be operating on a first set of data while the second component is simultaneously operating on a second sent of data. Additionally, the indexer 932 may at any time have multiple instances of the parsing module 934 and indexing module 936, with each set of instances configured to simultaneously operate on data from the same data source or from different data sources. The parsing module 934 and indexing module 936 are illustrated in FIG. 9 to facilitate discussion, with the understanding that implementations with other components are possible to achieve the same functionality.

The parsing module 934 determines information about incoming event data, where the information can be used to identify events within the event data. For example, the parsing module 934 can associate a source type with the event data. A source type identifies the data source 902 and describes a possible data structure of event data produced by the data source 902. For example, the source type can indicate which fields to expect in events generated at the data source 902 and the keys for the values in the fields, and possibly other information such as sizes of fields, an order of the fields, a field separator, and so on. The source type of the data source 902 can be specified when the data source 902 is configured as a source of event data. Alternatively, the parsing module 934 can determine the source type from the event data, for example from an event field in the event data or using machine learning techniques applied to the event data.

Other information that the parsing module 934 can determine includes timestamps. In some cases, an event includes a timestamp as a field, and the timestamp indicates a point in time when the action represented by the event occurred or was recorded by the data source 902 as event data. In these cases, the parsing module 934 may be able to determine from the source type associated with the event data that the timestamps can be extracted from the events themselves. In some cases, an event does not include a timestamp and the parsing module 934 determines a timestamp for the event, for example from a name associated with the event data from the data source 902 (e.g., a file name when the event data is in the form of a file) or a time associated with the event data (e.g., a file modification time). As another example, when the parsing module 934 is not able to determine a timestamp from the event data, the parsing module 934 may use the time at which it is indexing the event data. As another example, the parsing module 934 can use a user-configured rule to determine the timestamps to associate with events.

The parsing module 934 can further determine event boundaries. In some cases, a single line (e.g., a sequence of characters ending with a line termination) in event data represents one event while in other cases, a single line represents multiple events. In yet other cases, one event may span multiple lines within the event data. The parsing module 934 may be able to determine event boundaries from the source type associated with the event data, for example from a data structure indicated by the source type. In some implementations, a user can configure rules the parsing module 934 can use to identify event boundaries.

The parsing module 934 can further extract data from events and possibly also perform transformations on the events. For example, the parsing module 934 can extract a set of fields (key-value pairs) for each event, such as a host or hostname, source or source name, and/or source type. The parsing module 934 may extract certain fields by default or based on a user configuration. Alternatively or additionally, the parsing module 934 may add fields to events, such as a source type or a user-configured field. As another example of a transformation, the parsing module 934 can anonymize fields in events to mask sensitive information, such as social security numbers or account numbers. Anonymizing fields can include changing or replacing values of specific fields. The parsing component 934 can further perform user-configured transformations.

The parsing module 934 outputs the results of processing incoming event data to the indexing module 936, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 932 can be configured to identify searchable segments that are parts of fields, searchable segments that are entire fields, or both. The parsing module 934 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 946, to find event data that matches a search query. In some implementations, segmentation can alternatively be performed by the forwarder 926. Segmentation can also be disabled, in which case the indexer 932 will not build a lexicon for the event data. When segmentation is disabled, the search system searches the event data directly.

Building index data structures generates the index 938. The index 938 is a storage data structure on a storage device (e.g., a disk drive or other physical device for storing digital data). The storage device may be a component of the computing device on which the indexer 932 is operating (referred to herein as local storage) or may be a component of a different computing device (referred to herein as remote storage) that the indexer 938 has access to over a network. The indexer 932 can manage more than one index and can manage indexes of different types. For example, the indexer 932 can manage event indexes, which impose minimal structure on stored data and can accommodate any type of data. As another example, the indexer 932 can manage metrics indexes, which use a highly structured format to handle the higher volume and lower latency demands associated with metrics data.

The indexing module 936 organizes files in the index 938 in directories referred to as buckets. The files in a bucket 944 can include raw data files, index files, and possibly also other metadata files. As used herein, "raw data" means data as when the data was produced by the data source 902, without alteration to the format or content. As noted previously, the parsing component 934 may add fields to event data and/or perform transformations on fields in the event data. Event data that has been altered in this way is referred to herein as enriched data. A raw data file 948 can include enriched data, in addition to or instead of raw data. The raw data file 948 may be compressed to reduce disk usage. An index file 946, which may also be referred to herein as a "time-series index" or tsidx file, contains metadata that the indexer 932 can use to search a corresponding raw data file 948. As noted above, the metadata in the index file 946 includes a lexicon of the event data, which associates each unique keyword in the event data with a reference to the location of event data within the raw data file 948. The keyword data in the index file 946 may also be referred to as an inverted index. In various implementations, the data intake and query system can use index files for other purposes, such as to store data summarizations that can be used to accelerate searches.

A bucket 944 includes event data for a particular range of time. The indexing module 936 arranges buckets in the index 938 according to the age of the buckets, such that buckets for more recent ranges of time are stored in short-term storage 940 and buckets for less recent ranges of time are stored in long-term storage 942. Short-term storage 940 may be faster to access while long-term storage 942 may be slower to access. Buckets may be moves from short-term storage 940 to long-term storage 942 according to a configurable data retention policy, which can indicate at what point in time a bucket is old enough to be moved.

A bucket's location in short-term storage 940 or long-term storage 942 can also be indicated by the bucket's status. As an example, a bucket's status can be "hot," "warm," "cold," "frozen," or "thawed." In this example, hot bucket is one to which the indexer 932 is writing data and the bucket becomes a warm bucket when the index 932 stops writing data to it. In this example, both hot and warm buckets reside in short-term storage 940. Continuing this example, when a warm bucket is moved to long-term storage 942, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 920 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each bucket must exist within the cluster), and indexers to which buckets are copied may be selected to optimize distribution of data across the cluster.

A user can view the performance of the indexing system 920 through the monitoring console 916 provided by the user interface system 914. Using the monitoring console 916, the user can configure and monitor an index cluster, and see information such as disk usage by an index, volume usage by an indexer, index and volume size over time, data age, statistics for bucket types, and bucket settings, among other information.

FIG. 10 is a block diagram illustrating in greater detail an example of the search system 1060 of a data intake and query system, such as the data intake and query system 810 of FIG. 8. The search system 1060 of FIG. 10 issues a query 1066 to a search head 1062, which sends the query 1066 to a search peer 1064. Using a map process 1070, the search peer 1064 searches the appropriate index 1038 for events identified by the query 1066 and sends events 1078 so identified back to the search head 1062. Using a reduce process 1082, the search head 1062 processes the events 1078 and produces results 1068 to respond to the query 1066. The results 1068 can provide useful insights about the data stored in the index 1038. These insights can aid in the administration of information technology systems, in security analysis of information technology systems, and/or in analysis of the development environment provided by information technology systems.

The query 1066 that initiates a search is produced by a search and reporting app 1016 that is available through the user interface system 1014 of the data intake and query system. Using a network access application 1006 executing on a computing device 1004, a user can input the query 1066 into a search field provided by the search and reporting app 1016. Alternatively or additionally, the search and reporting app 1016 can include pre-configured queries or stored queries that can be activated by the user. In some cases, the search and reporting app 1016 initiates the query 1066 when the user enters the query 1066. In these cases, the query 1066 may be referred to as an "ad-hoc" query. In some cases, the search and reporting app 1016 initiates the query 1066 based on a schedule. For example, the search and reporting app 1016 can be configured to execute the query 1066 once per hour, once per day, at a specific time, on a specific date, or at some other time that can be specified by a date, time, and/or frequency. These types of queries may be referred to as scheduled queries.

The query 1066 is specified using a search processing language. The search processing language includes commands or search terms that the search peer 1064 will use to identify events to return in the search results 1068. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1066 to include sequential commands, where a subsequent command may operate on the results of a prior command. As an example, sequential commands may be separated in the query 1066 by a vertical line ("|" or "pipe") symbol.

In addition to one or more search commands, the query 1066 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1066 occurs in two broad phases: a map phase 1050 and a reduce phase 1052. The map phase 1050 takes place across one or more search peers. In the map phase 1050, the search peers locate event data that matches the search terms in the search query 1066 and sorts the event data into field-value pairs. When the map phase

1050 is complete, the search peers send events that they have found to one or more search heads for the reduce phase 1052. During the reduce phase 1052, the search heads process the events through commands in the search query 1066 and aggregate the events to produce the final search results 1068.

A search head, such as the search head 1062 illustrated in FIG. 10, is a component of the search system 1060 that manages searches. The search head 1062, which may also be referred to herein as a search management component, can be implemented using program code that can be executed on a computing device. The program code for the search head 1062 can be stored on a non-transitory computer-readable medium and from this medium can be loaded or copied to the memory of a computing device. One or more hardware processors of the computing device can read the program code from the memory and execute the program code in order to implement the operations of the search head 1062.

Upon receiving the search query 1066, the search head 1062 directs the query 1066 to one or more search peers, such as the search peer 1064 illustrated in FIG. 10. "Search peer" is an alternate name for "indexer" and a search peer may be largely similar to the indexer described previously. The search peer 1064 may be referred to as a "peer node" when the search peer 1064 is part of an indexer cluster. The search peer 1064, which may also be referred to as a search execution component, can be implemented using program code that can be executed on a computing device. In some implementations, one set of program code implements both the search head 1062 and the search peer 1064 such that the search head 1062 and the search peer 1064 form one component. In some implementations, the search head 1062 is an independent piece of code that performs searching and no indexing functionality. In these implementations, the search head 1062 may be referred to as a dedicated search head.

The search head 1062 may consider multiple criteria when determining whether to send the query 1066 to the particular search peer 1064. For example, the search system 1060 may be configured to include multiple search peers that each have duplicative copies of at least some of the event data and are implanted using different hardware resources q. In this example, the sending the search query 1066 to more than one search peer allows the search system 1060 to distribute the search workload across different hardware resources. As another example, search system 1060 may include different search peers for different purposes (e.g., one has an index storing a first type of data or from a first data source while a second has an index storing a second type of data or from a second data source). In this example, the search query 1066 may specify which indexes to search, and the search head 1062 will send the query 1066 to the search peers that have those indexes.

To identify events 1078 to send back to the search head 1062, the search peer 1064 performs a map process 1070 to obtain event data 1074 from the index 1038 that is maintained by the search peer 1064. During a first phase of the map process 1070, the search peer 1064 identifies buckets that have events that are described by the time indicator in the search query 1066. As noted above, a bucket contains events whose timestamps fall within a particular range of time. For each bucket 1044 whose events can be described by the time indicator, during a second phase of the map process 1070, the search peer 1064 performs a keyword search 1074 using search terms specified in the search query #A66. The search terms can be one or more of keywords, phrases, fields, Boolean expressions, and/or comparison expressions that in combination describe events being searched for. When segmentation is enabled at index time, the search peer 1064 performs the keyword search 1072 on the bucket's index file 1046. As noted previously, the index file 1046 includes a lexicon of the searchable terms in the events stored in the bucket's raw data 1048 file. The keyword search 1072 searches the lexicon for searchable terms that correspond to one or more of the search terms in the query 1066. As also noted above, the lexicon incudes, for each searchable term, a reference to each location in the raw data 1048 file where the searchable term can be found. Thus, when the keyword search identifies a searchable term in the index file 1046 that matches a search term in the query 1066, the search peer 1064 can use the location references to extract from the raw data 1048 file the event data 1074 for each event that include the searchable term.

In cases where segmentation was disabled at index time, the search peer 1064 performs the keyword search 1072 directly on the raw data 1048 file. To search the raw data 1048, the search peer 1064 may identify searchable segments in events in a similar manner as when the data was indexed. Thus, depending on how the search peer 1064 is configured, the search peer 1064 may look at event fields and/or parts of event fields to determine whether an event matches the query 1066. Any matching events can be added to the event data #A74 read from the raw data 1048 file. The search peer 1064 can further be configured to enable segmentation at search time, so that searching of the index 1038 causes the search peer 1064 to build a lexicon in the index file 1046.

The event data 1074 obtained from the raw data 1048 file includes the full text of each event found by the keyword search 1072. During a third phase of the map process 1070, the search peer 1064 performs event processing 1076 on the event data 1074, with the steps performed being determined by the configuration of the search peer 1064 and/or commands in the search query 1066. For example, the search peer 1064 can be configured to perform field discovery and field extraction. Field discovery is a process by which the search peer 1064 identifies and extracts key-value pairs from the events in the event data 1074. The search peer 1064 can, for example, be configured to automatically extract the first 100 fields (or another number of fields) in the event data 1074 that can be identified as key-value pairs. As another example, the search peer 1064 can extract any fields explicitly mentioned in the search query 1066. The search peer 1064 can, alternatively or additionally, be configured with particular field extractions to perform.

Other examples of steps that can be performed during event processing 1076 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1064 sends processed events 1078 to the search head 1062, which performs a reduce process 1080. The reduce process 1080 potentially receives events from multiple search peers and performs various results processing 1082 steps on the received events. The results processing 1082 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1082 can further include applying commands from the search query 1066 to the events. The query 1066 can include, for example, commands for evaluating and/or manipulating fields (e.g., to generate new fields from existing fields or parse fields that have more than one value). As another example, the query 1066 can include commands for calculating statistics over the events, such as counts of the occurrences of fields, or sums, averages, ranges, and so on, of field values. As another example, the query 1066 can include commands for generating statistical values for purposes of generating charts of graphs of the events.

The reduce process 1080 outputs the events found by the search query 1066, as well as information about the events. The search head 1062 transmits the events and the information about the events as search results 1068, which are received by the search and reporting app 1016. The search and reporting app 1016 can generate visual interfaces for viewing the search results 1068. The search and reporting app 1016 can, for example, output visual interfaces for the network access application 1006 running on a computing device 1004 to generate.

The visual interfaces can include various visualizations of the search results 1068, such as tables, line or area charts, Chloropleth maps, or single values. The search and reporting app 1016 can organize the visualizations into a dashboard, where the dashboard includes a panel for each visualization. A dashboard can thus include, for example, a panel listing the raw event data for the events in the search results 1068, a panel listing fields extracted at index time and/or found through field discovery along with statistics for those fields, and/or a timeline chart indicating how many events occurred at specific points in time (as indicated by the timestamps associated with each event). In various implementations, the search and reporting app 1016 can provide one or more default dashboards. Alternatively or additionally, the search and reporting app 1016 can include functionality that enables a user to configure custom dashboards.

The search and reporting app 1016 can also enable further investigation into the events in the search results 1016. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1066. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 11:
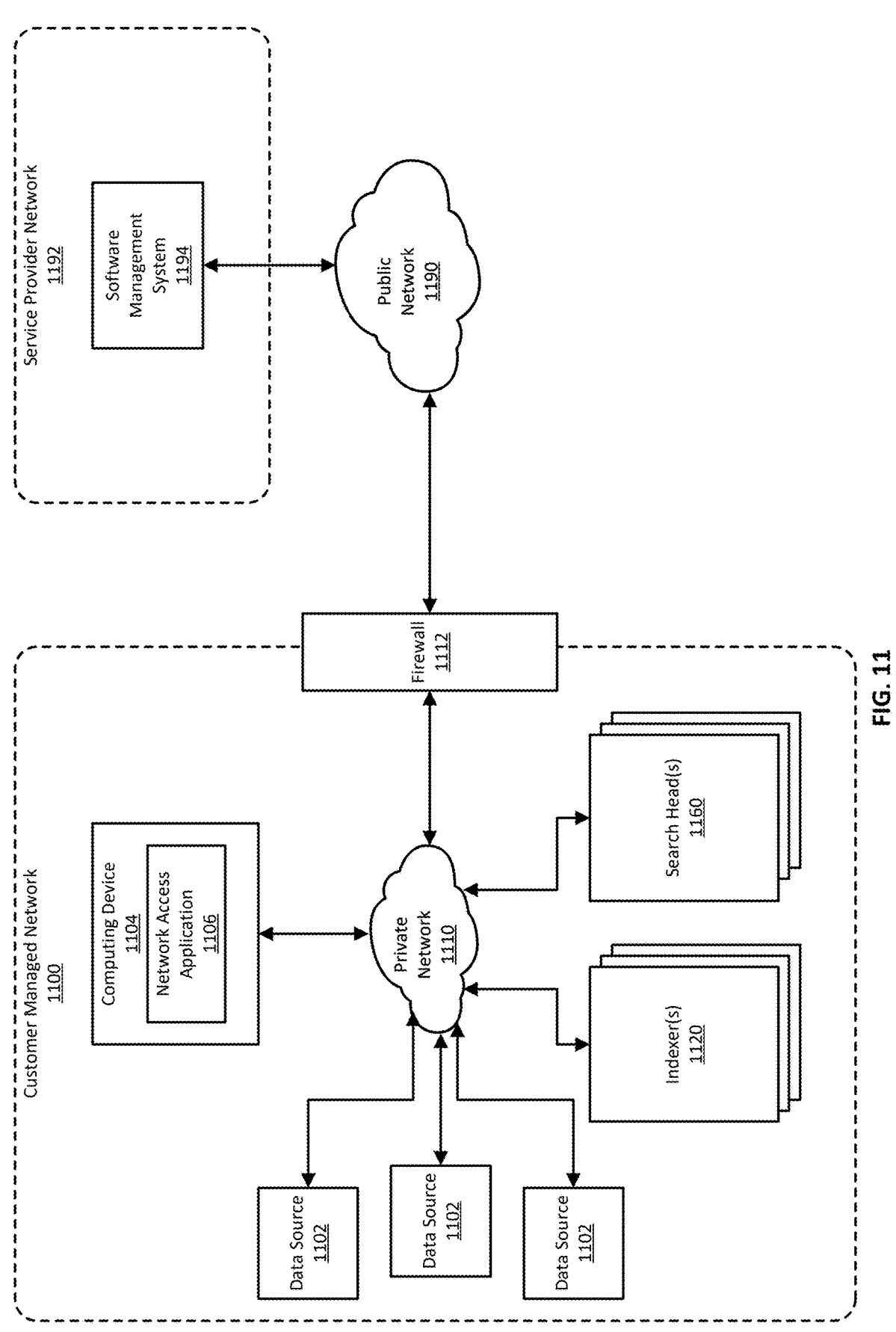
FIG. 11 illustrates an example diagram of a self-managed network that includes a data intake and query system in which FIG. 2 may be implemented.

FIG. 11 illustrates an example of a self-managed network 1100 that includes a data intake and query system. "Self-managed" in this instance means that the entity that is operating the self-managed network 1100 configures, administers, maintains, and/or operates the data intake and query system using its own compute resources and people. Further, the self-managed network 1100 of this example is part of the entity's on-premise network and comprises a set of compute, memory, and networking resources that are located, for example, within the confines of an entity's data center. These resources can include software and hardware resources. The entity can, for example, be a company or enterprise, a school, government entity, or other entity. Since the self-managed network 1100 is located within the customer's on-prem environment, such as in the entity's data center, the operation and management of the self-managed network 1100, including of the resources in the self-managed network 1100, is under the control of the entity. For example, administrative personnel of the entity have complete access to and control over the configuration, management, and security of the self-managed network 1100 and its resources.

The self-managed network 1100 can execute one or more instances of the data intake and query system. An instance of the data intake and query system may be executed by one or more computing devices that are part of the self-managed network 1100. A data intake and query system instance can comprise an indexing system and a search system, where the indexing system includes one or more indexers 1120 and the search system includes one or more search heads 1160.

As depicted in FIG. 11, the self-managed network 1100 can include one or more data sources 1102. Data received from these data sources may be processed by an instance of the data intake and query system within self-managed network 1100. The data sources 1102 and the data intake and query system instance can be communicatively coupled to each other via a private network 1110.

Users associated with the entity can interact with and avail themselves of the functions performed by a data intake and query system instance using computing devices. As depicted in FIG. 11, a computing device 1104 can execute a network access application 1106 (e.g., a web browser), that can communicate with the data intake and query system instance and with data sources 1102 via the private network 1110. Using the computing device 1104, a user can perform various operations with respect to the data intake and query system, such as management and administration of the data intake and query system, generation of knowledge objects, and other functions. Results generated from processing performed by the data intake and query system instance may be communicated to the computing device 1104 and output to the user via an output system (e.g., a screen) of the computing device 1104.

The self-managed network 1100 can also be connected to other networks that are outside the entity's on-premises environment/network, such as networks outside the entity's data center. Connectivity to these other external networks is controlled and regulated through one or more layers of security provided by the self-managed network 1100. One or more of these security layers can be implemented using firewalls 1112. The firewalls 1112 form a layer of security around the self-managed network 1100 and regulate the transmission of traffic from the self-managed network 1100 to the other networks and from these other networks to the self-managed network 1100.

Networks external to the self-managed network can include various types of networks including public networks 1190, other private networks, and/or cloud networks provided by one or more cloud service providers. An example of a public network 1190 is the Internet. In the example depicted in FIG. 11, the self-managed network 1100 is connected to a service provider network 1192 provided by a cloud service provider via the public network 1190.

In some implementations, resources provided by a cloud service provider may be used to facilitate the configuration and management of resources within the self-managed network 1100. For example, configuration and management of a data intake and query system instance in the self-managed network 1100 may be facilitated by a software management system 1194 operating in the service provider network 1192. There are various ways in which the software management system 1194 can facilitate the configuration and management of a data intake and query system instance within the self-managed network 1100. As one example, the software management system 1194 may facilitate the download of software including software updates for the data intake and query system. In this example, the software management system 1194 may store information indicative of the versions of the various data intake and query system instances present in the self-managed network 1100. When a software patch or upgrade is available for an instance, the software management system 1194 may inform the self-managed network 1100 of the patch or upgrade. This can be done via messages communicated from the software management system 1194 to the self-managed network 1100.

The software management system 1194 may also provide simplified ways for the patches and/or upgrades to be downloaded and applied to the self-managed network 1100. For example, a message communicated from the software management system 1194 to the self-managed network 1100 regarding a software upgrade may include a Uniform Resource Identifier (URI) that can be used by a system administrator of the self-managed network 1100 to download the upgrade to the self-managed network 1100. In this manner, management resources provided by a cloud service provider using the service provider network 1192 and which are located outside the self-managed network 1100 can be used to facilitate the configuration and management of one or more resources within the entity's on-prem environment. In some implementations, the download of the upgrades and patches may be automated, whereby the software management system 1194 is authorized to, upon determining that a patch is applicable to a data intake and query system instance inside the self-managed network 1100, automatically communicate the upgrade or patch to self-managed network 1100 and cause it to be installed within self-managed network 1100.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/ steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices.

Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:

receiving, by a cluster manager of a peer cluster comprising a plurality of peer nodes, a notification of a corrupted bucket stored in the peer cluster; and performing, by the cluster manager, a bucket recovery operation, comprising:

for each peer node of a subset of the plurality of peer nodes, sending a request to the peer node to report a bucket health metric for a bucket copy corresponding to the corrupted bucket stored on the peer node, obtaining, from each peer node of the subset of the plurality of peer nodes, a corresponding bucket health metric comprising a searchable event count of the respective bucket copy stored on the peer node, electing, as a canonical bucket copy, a bucket copy having a searchable event count with a highest value, wherein the canonical bucket copy is stored on an elected peer node, and sending a replicate command to the elected peer node storing the canonical bucket copy to replicate the canonical bucket copy to the plurality of peer nodes of the peer cluster.

2. The method of claim 1, wherein the subset of the plurality of peer nodes includes peer nodes that store the bucket copy corresponding to the corrupted bucket.

3. The method of claim 1, wherein the request to report the bucket health metric is received by a first peer node of the subset of the plurality of peer nodes; and wherein the method further comprises rebuilding, by the first peer node, the bucket copy stored on the first peer node responsive to the request.

4. The method of claim 1, further comprising:

reporting, by a first peer node of the subset of the plurality of peer nodes, to the cluster manager, a bucket rebuild process status of the first peer node and an updated bucket health metric of the bucket copy stored on the first peer node, wherein the updated bucket health metric includes at least the searchable event count.

5. The method of claim 1, further comprising:

by the cluster manager, prior to sending the replicate command:

sending an instruction to a first peer node of the subset of the plurality of peer nodes to discard the respective bucket copy stored on the first peer node, wherein the searchable event count corresponding to the respective bucket copy stored on the first peer node is less than the searchable event count corresponding to the canonical bucket copy.

6. The method of claim 1, further comprising:

adding, by the cluster manager, an identifier of the corrupted bucket to a corrupted bucket queue, wherein the corrupted bucket queue comprises a plurality of identifiers corresponding to a plurality of corrupted buckets.

7. The method of claim 6, further comprising:

scheduling, by the cluster manager, a plurality of concurrent instances of a bucket recovery process for each corrupted bucket of at least a subset of the plurality of identifiers in the corrupted bucket queue, wherein the plurality of concurrent instances of the bucket recovery process is less than a concurrent instance threshold.

8. The method of claim 1, wherein the peer cluster further comprises the plurality of peer nodes, at least one search head, and the cluster manager, and wherein a number of plurality of peer nodes in the peer cluster corresponds at least to a replication factor, and wherein the plurality of peer nodes stores a plurality of machine generated events in a plurality of buckets, the plurality of buckets comprising the corrupted bucket; and wherein a number of bucket copies corresponding to the corrupted bucket corresponds to the replication factor.

9. The method of claim 1, further comprising:

receiving, by the cluster manager, the notification of the corrupted bucket from an administrative application, as at least one of a representational state transfer (REST) call, a command line instruction (CLI), and a Web User Interface (WebUI) call.

10. The method of claim 1, wherein receiving the notification of the corrupted bucket comprises:

receiving, by the cluster manager, the notification of the corrupted bucket from a first peer node of the peer cluster.

11. The method of claim 1, further comprising:

generating, by a first peer node, a read error notification; and adding, by a peer engine executing on the first peer node, an identifier of the corrupted bucket to a corrupted bucket queue corresponding to the first peer node, wherein the corrupted bucket queue corresponding to the first peer node comprises a plurality of identifiers of a plurality of corrupted buckets.

12. The method of claim 11, further comprising:

periodically sending, by the first peer node, the corrupted bucket queue as the notification to the cluster manager by a REST Hypertext Transfer Protocol (HTTP) request.

13. The method of claim 1, further comprising:

determining, by a first peer node, during a restart process, a mismatch between a bucket journal size corresponding to a bucket health metric of a bucket of the first peer node and a bucket journal size stored in a bucket manifest entry corresponding to the bucket from a bucket manifest stored on the first peer node, and transmitting, by the first peer node, the notification responsive to the mismatch.

14. A computing device, comprising:

a processor; and a non-transitory computer-readable medium having stored thereon instructions that, when executed by the processor, cause the processor to perform operations comprising:

receiving, by a cluster manager of a peer cluster comprising a plurality of peer nodes, a notification of a corrupted bucket stored in the peer cluster; and performing, by the cluster manager, a bucket recovery operation, comprising:

for each peer node of a subset of the plurality of peer nodes, sending a request to the peer node to report a bucket health metric for a bucket copy corresponding to the corrupted bucket stored on the peer node, obtaining, from each peer node of the subset of the plurality of peer nodes, a corresponding bucket health metric comprising a searchable event count of the respective bucket copy stored on the peer node, electing, as a canonical bucket copy, a bucket copy having a searchable event count with a highest value, wherein the canonical bucket copy is stored on an elected peer node, and sending a replicate command to the elected peer node storing the canonical bucket copy to replicate the canonical bucket copy to the plurality of peer nodes of the peer cluster.

15. The computing device of claim 14, wherein the subset of the plurality of peer nodes includes peer nodes that store the bucket copy corresponding to the corrupted bucket.

16. The computing device of claim 14, wherein the request to report a bucket health metric is received by a first peer node of the subset of the plurality of peer nodes; and wherein the operations further comprise rebuilding, by the first peer node, the bucket copy stored on the first peer node responsive to the request.

17. The computing device of claim 14, wherein the operations further comprise:

reporting, by a first peer node of the subset of the plurality of peer nodes, to the cluster manager, a bucket rebuild process status of the first peer node and an updated bucket health metric of the bucket copy stored on the first peer node, wherein the updated bucket health metric includes at least the searchable event count.

18. The computing device of claim 14, wherein the operations further comprise:

prior to sending the replicate command:

sending an instruction to a first peer node of the subset of the plurality of peer nodes to discard the respective bucket copy stored on the first peer node, wherein the searchable event count corresponding to the respective bucket copy stored on the first peer node is less than the searchable event count corresponding to the canonical bucket copy.

19. A non-transitory computer-readable medium having stored thereon instructions that, when executed by one or more processors, cause the one or more processors to perform operations comprising:

receiving, by a cluster manager of a peer cluster comprising a plurality of peer nodes, a notification of a corrupted bucket stored in the peer cluster; and performing, by the cluster manager, a bucket recovery operation, comprising:

for each peer node of a subset of the plurality of peer nodes, sending a request to the peer node to report a bucket health metric for a bucket copy corresponding to the corrupted bucket stored on the peer node, obtaining, from each peer node of the subset of the plurality of peer nodes, a corresponding bucket health metric comprising a searchable event count of the respective bucket copy stored on the peer node, electing, as a canonical bucket copy, a bucket copy having a searchable event count with a highest value, wherein the canonical bucket copy is stored on an elected peer node, and sending a replicate command to the elected peer node storing the canonical bucket copy to replicate the canonical bucket copy to the plurality of peer nodes of the peer cluster.

20. The non-transitory computer-readable medium of claim 19, wherein the subset of the plurality of peer nodes includes peer nodes that store the bucket copy corresponding to the corrupted bucket.

* * * * *